(12) United States Patent
Hayashi et al.

(10) Patent No.: US 9,432,643 B2
(45) Date of Patent: Aug. 30, 2016

(54) IMAGE PROCESSING DEVICE, IMAGE CAPTURE DEVICE, IMAGE PROCESSING METHOD, AND NON-TRANSITORY COMPUTER-READABLE MEDIUM

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/810,168

(22) Filed: Jul. 27, 2015

(65) Prior Publication Data

US 2015/0334359 A1 Nov. 19, 2015

Related U.S. Application Data

(63) Continuation of application No. PCT/JP2013/062466, filed on Apr. 26, 2013.

(30) Foreign Application Priority Data

Feb. 5, 2013 (JP) ................................ 2013-020490

(51) Int. Cl.
| | |
|---|---|
| H04N 9/04 | (2006.01) |
| H04N 9/64 | (2006.01) |
| G06T 5/20 | (2006.01) |
| G06T 5/00 | (2006.01) |
| G06T 3/40 | (2006.01) |

(52) U.S. Cl.
CPC ............. *H04N 9/045* (2013.01); *G06T 3/4015* (2013.01); *G06T 5/003* (2013.01); *G06T 5/20* (2013.01); *H04N 9/646* (2013.01); *G06T 2200/32* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 7,253,836 | B1 * | 8/2007 | Suzuki ................... | H04N 5/772 348/234 |
| 7,525,583 | B2 * | 4/2009 | Kimbell ................. | H04N 9/045 348/241 |

(Continued)

FOREIGN PATENT DOCUMENTS

| | | |
|---|---|---|
| CN | 102844788 A | 12/2012 |
| JP | 2001-197356 A | 7/2001 |

(Continued)

OTHER PUBLICATIONS

International Preliminary Report on Patentability (PCT/IPEA/409), issued in PCT/JP2013/062466, dated Feb. 26, 2014.

(Continued)

*Primary Examiner* — Michael Osinski
(74) *Attorney, Agent, or Firm* — Birch, Stewart, Kolasch & Birch, LLP

(57) ABSTRACT

An image processing device includes a demosaicing process device, a luminance system image data acquisition device that acquires luminance system image data as image data regarding the luminance, a point image restoration process execution device, an information acquisition device that acquires control information concerning execution of the point image restoration process on the basis of imaging information concerning an imaging condition of a subject, and a point image restoration process control device.

15 Claims, 24 Drawing Sheets

(56) References Cited

U.S. PATENT DOCUMENTS

| | | | |
|---|---|---|---|
| 7,907,791 B2* | 3/2011 | Kinrot | G06T 1/0007 |
| | | | 382/276 |
| 8,508,618 B2* | 8/2013 | Kishine | H04N 9/045 |
| | | | 348/222.1 |
| 8,605,163 B2* | 12/2013 | Hatakeyama | H04N 9/045 |
| | | | 348/222.1 |
| 8,798,389 B2* | 8/2014 | Hatakeyama | G06T 5/003 |
| | | | 382/260 |
| 8,837,866 B2* | 9/2014 | Minegishi | G06T 5/002 |
| | | | 382/298 |
| 8,941,762 B2 | 1/2015 | Hatakeyama | |
| 8,971,622 B2* | 3/2015 | Kano | H04N 9/045 |
| | | | 348/242 |
| 9,117,293 B2* | 8/2015 | Kuzuya | G06T 3/4053 |
| 9,167,216 B2* | 10/2015 | Kano | H04N 9/045 |
| 2001/0008418 A1 | 7/2001 | Yamanaka et al. | |
| 2002/0167602 A1* | 11/2002 | Nguyen | G06T 3/4007 |
| | | | 348/280 |
| 2003/0048368 A1* | 3/2003 | Bosco | G06T 5/20 |
| | | | 348/272 |
| 2003/0086606 A1* | 5/2003 | Hunter | G06T 3/4015 |
| | | | 382/167 |
| 2003/0184663 A1* | 10/2003 | Nakano | H04N 1/4092 |
| | | | 348/241 |
| 2005/0276475 A1* | 12/2005 | Sawada | H04N 1/648 |
| | | | 382/167 |
| 2006/0092298 A1* | 5/2006 | Ishiga | H04N 9/045 |
| | | | 348/272 |
| 2006/0268134 A1* | 11/2006 | Chen | H04N 9/045 |
| | | | 348/241 |
| 2007/0133902 A1* | 6/2007 | Kumar | G06T 3/4015 |
| | | | 382/298 |
| 2007/0153335 A1* | 7/2007 | Hosaka | H04N 1/58 |
| | | | 358/463 |
| 2008/0013850 A1 | 1/2008 | Sakurai et al. | |
| 2010/0079615 A1 | 4/2010 | Hatakeyama | |
| 2010/0284458 A1* | 11/2010 | Andersson | H04N 19/176 |
| | | | 375/240.03 |
| 2011/0135213 A1 | 6/2011 | Hatakeyama | |
| 2011/0149121 A1* | 6/2011 | Ono | H04N 9/045 |
| | | | 348/242 |
| 2015/0097993 A1* | 4/2015 | Oniki | H04N 5/23229 |
| | | | 348/241 |
| 2015/0264333 A1* | 9/2015 | Ishiga | H01L 27/14623 |
| | | | 382/154 |
| 2015/0310592 A1* | 10/2015 | Kano | H04N 1/58 |
| | | | 382/167 |
| 2016/0080711 A1* | 3/2016 | Oniki | G06T 5/003 |
| | | | 348/242 |
| 2016/0110851 A1* | 4/2016 | Oniki | G06T 5/20 |
| | | | 348/241 |

FOREIGN PATENT DOCUMENTS

| | | |
|---|---|---|
| JP | 2008-042874 A | 2/2008 |
| JP | 2010-086138 A | 4/2010 |
| JP | 2011-124692 A | 6/2011 |
| JP | 2011-193276 A | 9/2011 |
| JP | 2012-005056 A | 1/2012 |

OTHER PUBLICATIONS

International Search Report, issued in PCT/JP2013/062466, dated Jul. 2, 2013.
Written Opinion of the International Searching Authority, issued in PCT/JP2013/062466, dated Jul. 2, 2013.
Chinese Office Action of CN 201380072322.0 dated May 30, 2016 with English language translation.

* cited by examiner

FIG.2

| G | R | G | R |
|---|---|---|---|
| B | G | B | G |
| G | R | G | R |
| B | G | B | G |

IMAGE PROCESSING DEVICE, IMAGE CAPTURE DEVICE, IMAGE PROCESSING METHOD, AND NON-TRANSITORY COMPUTER-READABLE MEDIUM

CROSS-REFERENCE TO RELATED APPLICATIONS

This application is a Continuation of PCT International Application No. PCT/JP2013/062466 filed on Apr. 26, 2013, which claims priority under 35 U.S.C §119(a) to Japanese Patent Application No. 2013-20490 filed on Feb. 5, 2013. Each of the above application(s) is hereby expressly incorporated by reference, in its entirety, into the present application.

BACKGROUND OF THE INVENTION

1. Field of the Invention

The present invention relates to a technology concerning image processing, and particularly relates to image processing by way of a point image restoration process on the basis of a point spread function (PSF).

2. Description of the Related Art

Image deterioration caused by various aberrations of an optical system (e.g., imaging lens) sometimes occurs in an image obtained by capturing a subject by an image capture device such as a digital camera.

In order to prevent the image deterioration (diffraction blur, peripheral blur, chromatic aberration of magnification, etc.) caused by the aberration, a technology has been devised in which image data of the subject image is subjected to image processing to eliminate (correct) the image deterioration caused by the aberration.

The image deterioration due to the aberration may be represented by a point spread function (PSF), and the image deterioration may be eliminated by subjecting the image data to a restoration filter (inverse filter) of the point spread function (point image restoration process).

However, a false color or aliasing may be generated even more in some images by performing the point image restoration process, which reduces the quality of the image, in some cases.

Therefore, Japanese Patent Application Laid-Open No. 2010-086138 (hereinafter referred to as PTL 1) discloses a technology relating to an image restoration process (that may be considered to correspond to the point image restoration process of the present application) in which a portion where the false color is to be generated by performing the image restoration process is not subjected to the image restoration process. PTL 1 discloses it is preferable that the image restoration process is performed before a demosaicing process (that may be considered to correspond to a demosaicing process of the present application).

Japanese Patent Application Laid-Open No. 2011-124692 (hereinafter referred to as PTL 2) discloses that a restoration degree of the image restoration process may be continuously adjustable, and the false color generated can be suppressed by adjusting the restoration degree. However, the chromatic aberration of magnification is generated along with decrease of the restoration degree, which is disclosed also.

SUMMARY OF THE INVENTION

However, in the technology disclosed in PTL 1, since the false color is taken into account to perform the image restoration process, but the aliasing generated due to the chromatic aberration and demosaicing process is not taken into account to perform the image restoration process, the aliasing caused by the chromatic aberration and the demosaicing process as generation factors may involve the image deterioration in some cases. Here, the false color disclosed in PTL 1 refers to those generated when there is a difference between an aberration state varying depending on a state of the optical system in image capturing and an aberration state the image restoration filter deals with, in a case where a non-focusing object is subjected to the image restoration process using an image restoration filter (that may considered to correspond to a restoration filter of the present application) which is optimal for a focusing distance but not optimal for a non-focusing distance. The aliasing generated due to the chromatic aberration and demosaicing process in the present application is described later in detail.

In addition, in the technology disclosed in PTL 1, since a generation degree of the chromatic aberration as one of the generation factors of the false color is not taken into account, even a portion having a slight generation degree of the chromatic aberration may not be subjected to the image restoration process in some cases. In a case where only a slight false color is generated if the image restoration process is performed, a good quality image may rather be obtained by performing the image restoration process. Further, the image restoration process can be adequately performed by performing the image restoration process on a luminance system image data obtained after the demosaicing process rather than performing the image restoration process before the demosaicing process.

In the technology disclosed in PTL 2, since an artifact and the false color are taken into account to perform the image restoration process, but the aliasing generated due to the chromatic aberration and demosaicing process is not taken into account to perform the image restoration process, the aliasing caused by the chromatic aberration and the demosaicing process as generation factors may involve the image deterioration in some cases. Here, the artifact disclosed in PTL 2 is generated in a restored image in a case where there is a difference between an aberration property generated in a state of being actually imaged and an aberration property predicted in the image restoration. The false color disclosed in PTL 2 is generated in a restored image if the restoration degree is different from that predicted for each color component of RGB.

In the technology disclosed in PTL 2, since the aliasing caused by the chromatic aberration and the demosaicing process is not taken into account to perform the image restoration process, the aliasing caused by the chromatic aberration and the demosaicing process as the generation factors may involve the image deterioration in some cases. Since the generation degree of the chromatic aberration as one of the generation factors of the false color is not taken into account, the image restoration process may not be adequately adjusted depending on the generation of the chromatic aberration of magnification in some cases.

The present invention has been made in consideration of such a circumstance, and has an object to provide an image processing device, an image capture device, an image processing method, and a non-transitory computer-readable medium recording a program capable of obtaining an image of a higher image quality by executing the point image restoration process with the generation degree of the aliasing due to the chromatic aberration being taken into account and capable of obtaining a clear image by executing the point image restoration process on the luminance system image data.

In order to achieve the above object, an image processing device according to an aspect of the present invention includes a demosaicing process device configured to perform a demosaicing process on mosaic image data output from an image pickup device to generate demosaicing image data, a luminance system image data acquisition device configured to acquire luminance system image data as image data regarding luminance on the basis of the demosaicing image data obtained by the demosaicing process device, a point image restoration process execution device configured to execute a point image restoration process on the luminance system image data acquired by the luminance system image data acquisition device, an information acquisition device configured to acquire control information concerning execution of the point image restoration process on the basis of imaging information concerning an imaging condition of a subject, and a point image restoration process control device configured to control a processing operation of the point image restoration process execution device on the basis of the control information acquired by the information acquisition device.

This allows the point image restoration process to be executed with the generation degree of the aliasing due to the chromatic aberration and the demosaicing process being taken into account, obtaining an image of a higher image quality. The point image restoration process performed on the luminance system image data makes it possible to obtain the clearer image.

In the image processing device, the imaging information may preferably include at least one of information concerning a lens used for imaging, an aperture value in imaging, a focal length in imaging, and a subject distance in imaging.

This allows the point image restoration process to be more adequately executed with the generation degree of the aliasing due to the chromatic aberration and the demosaicing process being taken into account, obtaining an image of a higher image quality.

The image processing device preferably includes an image analysis device configured to analyze, on the basis of the mosaic image data or the demosaicing image data, whether or not the image data is the mosaic image data in which aliasing is intensified if the point image restoration process is executed, or whether or not the image data is the demosaicing image data in which aliasing is intensified if the point image restoration process is executed, in which the information acquisition device acquires the control information on the basis of the imaging information and analysis information acquired by the image analysis device.

This allows the point image restoration process to be executed with taking into account not only imaging information but also analysis information obtained by analyzing an imaged picture, obtaining an image of a higher image quality.

In the image processing device, preferably, the image analysis device may find a magnitude of contrast on the basis of the mosaic image data or the demosaicing image data in order to analyze whether or not the image data is the mosaic image data in which aliasing is intensified if the point image restoration process is executed, or whether or not the image data is the demosaicing image data in which aliasing is intensified if the point image restoration process is executed.

This makes it possible to more adequately grasp the generation degree of the aliasing due to the chromatic aberration and the demosaicing process by the image analysis, and allows the point image restoration process to be more adequately executed with the generation degree of the aliasing due to the chromatic aberration being taken into account, obtaining an image of a higher image quality.

In the image processing device, preferably, the point image restoration process control device determines whether or not aliasing is intensified if the point image restoration process is executed, depending on the control information, the point image restoration process control device, in a case of determining that the aliasing is not intensified, controls the point image restoration process execution device to execute the point image restoration process on the luminance system image data, and the point image restoration process control device, in a case of determining that the aliasing is intensified, inhibits the point image restoration process execution device from executing the point image restoration process on the luminance system image data.

This allows the point image restoration process to be more adequately executed depending on the generation degree of the aliasing due to the chromatic aberration and the demosaicing process, obtaining an image of a higher image quality.

In the image processing device, preferably, the point image restoration process control device determines whether or not the aliasing is intensified if the point image restoration process is executed, depending on the control information, the point image restoration process control device, in a case of determining that the aliasing is not intensified, controls the point image restoration process execution device to execute the point image restoration process on the luminance system image data, and the point image restoration process control device, in a case of determining that the aliasing is intensified, identifies an aliasing intensified region that is a region where the aliasing is intensified, and controls the point image restoration process execution device to be inhibited from executing the point image restoration process on the aliasing intensified region and to execute the point image restoration process on a region other than the aliasing intensified region.

This allows the point image restoration process to be more adequately executed depending on the generation degree of the aliasing due to the chromatic aberration and the demosaicing process, obtaining an image of a higher image quality.

In the image processing device, preferably, the point image restoration process control device determines whether or not aliasing is intensified if the point image restoration process is executed, depending on the control information, the point image restoration process control device, in a case of determining that the aliasing is not intensified, controls the point image restoration process execution device to execute the point image restoration process on the luminance system image data, and the point image restoration process control device, in a case of determining that the aliasing is intensified, identifies an aliasing intensified region that is a region where the aliasing is intensified, controls the point image restoration process execution device to execute the point image restoration process on a region other than the aliasing intensified region, and controls the point image restoration process execution device on the aliasing intensified region to execute a point image restoration process weaker in an effect than and in place of the point image restoration process executed on the region other than the aliasing intensified region.

This allows the point image restoration process to be more adequately executed depending on the generation degree of the aliasing due to the chromatic aberration and the demosaicing process, obtaining an image of a higher image quality.

In the image processing device, preferably, the point image restoration process control device determines whether or not aliasing is intensified if the point image restoration process is executed, depending on the control information, the point image restoration process control device, in a case of determining that the aliasing is not intensified, controls the point image restoration process execution device to execute the point image restoration process on the luminance system image data, and the point image restoration process control device, in a case of determining that the aliasing is intensified, identifies an aliasing intensified degree that is a degree to which the aliasing is intensified, and controls the point image restoration process execution device to execute the point image restoration process with strength of the point image restoration process being varied depending on the aliasing intensified degree.

This allows the point image restoration process to be more adequately executed depending on the generation degree of the aliasing due to the chromatic aberration and the demosaicing process, obtaining an image of a higher image quality.

In the image processing device, preferably, the aliasing intensified region identified by the point image restoration process control device is a region having a high image height.

This allows the point image restoration process to be more adequately executed depending on the generation degree of the aliasing due to the chromatic aberration and the demosaicing process, obtaining an image of a higher image quality.

In the image processing device, preferably, the aliasing intensified degree identified by the point image restoration process control device becomes larger relative to the image height.

In the image processing device, preferably, the luminance system image data is a luminance signal obtained on the basis of color data in the demosaicing image data having the highest contribution ratio for acquiring a luminance signal, or the demosaicing image data.

This allows the more effective point image restoration process to be executed.

In the image processing device, preferably, the luminance system image data is a value of a luminance signal Y in a color space represented by a luminance signal Y and color-difference signals Cb and Cr.

In the image processing device, preferably, the demosaicing process device includes a process of determining a correlated direction in plural pixel signals constituting the mosaic image data on the basis of the color data in the mosaic image data having the highest contribution ratio for acquiring the luminance signal.

In the image processing device, preferably, the demosaicing process device includes a process of detecting an edge in the mosaic image data on the basis of the color data in the mosaic image data having the highest contribution ratio for acquiring the luminance signal.

In order to achieve the above object, an image capture device according to another aspect of the invention includes an image processing device which includes a demosaicing process device configured to perform a demosaicing process on mosaic image data output from an image pickup device to generate demosaicing image data, a luminance system image data acquisition device configured to acquire luminance system image data as image data regarding luminance on the basis of the demosaicing image data obtained by the demosaicing process device, a point image restoration process execution device configured to execute a point image restoration process on the luminance system image data acquired by the luminance system image data acquisition device, an information acquisition device configured to acquire control information concerning execution of the point image restoration process on the basis of imaging information in imaging a subject, and a point image restoration process control device configured to control a processing operation of the point image restoration process execution device on the basis of the control information acquired by the information acquisition device.

This allows the point image restoration process to be executed with the generation degree of the aliasing due to the chromatic aberration and the demosaicing process being taken into account, obtaining an image of a higher image quality. The point image restoration process performed on the luminance system image data makes it possible to obtain the clearer image.

In order to achieve the above object, an image processing method according to another aspect of the invention includes a demosaicing process step of performing a demosaicing process on mosaic image data output from an image pickup device to generate demosaicing image data, a luminance system image data acquisition step of acquiring luminance system image data regarding luminance on the basis of the demosaicing image data generated in the demosaicing process step, a point image restoration process execution step of executing a point image restoration process on the luminance system image data acquired in the luminance system image data acquisition step, an information acquisition step of acquiring control information concerning execution of the point image restoration process on the basis of imaging information concerning an imaging condition of a subject; and a point image restoration process control step of controlling a processing operation of the point image restoration process execution step on the basis of the control information acquired in the information acquisition step.

This allows the point image restoration process to be executed with the generation degree of the aliasing due to the chromatic aberration and the demosaicing process being taken into account, obtaining an image of a higher image quality. The point image restoration process performed on the luminance system image data makes it possible to obtain the clearer image.

In order to achieve the above object, a non-transitory computer-readable medium recording a program according to another aspect of the invention causes a computer to execute a demosaicing process step of performing a demosaicing process on mosaic image data output from an image pickup device to generate demosaicing image data, a luminance system image data acquisition step of acquiring luminance system image data regarding luminance on the basis of the demosaicing image data generated in the demosaicing process step, a point image restoration process execution step of executing a point image restoration process on the luminance system image data acquired in the luminance system image data acquisition step, an information acquisition step of acquiring control information concerning execution of the point image restoration process on the basis of imaging information concerning an imaging condition of a subject; and a point image restoration process control step of controlling a processing operation of the point image restoration process execution step on the basis of the control information acquired in the information acquisition step.

This allows the point image restoration process to be executed with the generation degree of the aliasing due to the chromatic aberration and the demosaicing process being taken into account, obtaining an image of a higher image quality. The point image restoration process performed on the luminance system image data makes it possible to obtain the clearer image.

According to the present invention, the point image restoration process executed with the generation degree of the aliasing due to the chromatic aberration and the demosaicing process being taken into account makes it possible to obtain an image of a higher image quality. According to the present invention, the point image restoration process executed on the luminance system image data makes it possible to obtain a clear image.

BRIEF DESCRIPTION OF THE DRAWINGS

FIG. 2 is an illustration showing a mosaic color filter array (Bayer array) arranged on an image pickup device.

DETAILED DESCRIPTION OF THE PREFERRED EMBODIMENTS

Hereinafter, a description is given of examples of the present invention with reference to the drawings. In the present application, the term "device" and the term "unit" are considered to have the same meanings in use. For example, a demosaicing process device and a demosaicing process unit have the same meaning, a luminance system image data acquisition device and a luminance system image data acquisition unit have the same meaning, a point image restoration process execution device and a point image restoration process execution unit may have the same meaning, an information acquisition device and an information acquisition unit may have the same meaning, a point image restoration process control device and a point image restoration process control unit may have the same meaning, and an image analysis device and an image analysis unit may have the same meaning.

[Image Capture Device Having Image Processing Device]

Figure 1:
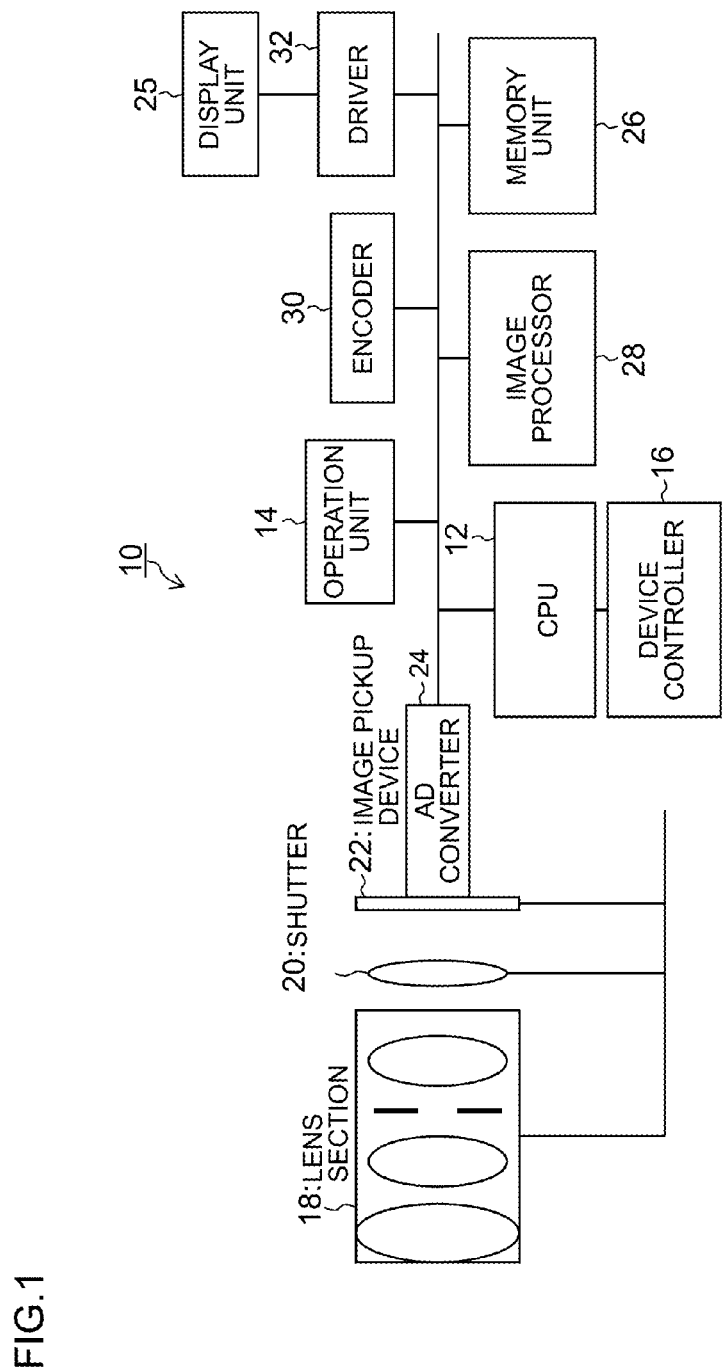
FIG. 1 is a main part block diagram of an image capture device as an aspect of the present invention.

FIG. 1 is a block diagram showing an embodiment of an image capture device 10 having an image processing device (phrased as an image processor in FIG. 1) 28 according to the invention.

The image capture device 10 having the image processor 28 according to the invention is a digital camera which records a captured image in an internal memory (memory unit 26) or an external recording medium (not shown), and operation of the entire device is overall controlled by a central processing unit (CPU) 12.

The image capture device 10 is provided with an operation unit 14 including a shutter button or shutter switch, mode dial, play button, MENU/OK key, cross-shaped key, zoom button, BACK key and the like. A signal from the operation unit 14 is input to the CPU 12, and the CPU 12 controls circuits in the image capture device 10 on the basis of the input signal, that is, controls, for example, a lens section 18, shutter 20, and image pickup device 22 serving as an image acquisition device via a device controller 16 as well as performs imaging operation control, image processing control, image data record/play control, display control of a display unit 25, and the like.

The lens section 18 includes a focus lens, zoom lens, diaphragm and the like, and a light flux passing through the lens section 18 and shutter 20 forms an image on a light receiving surface of the image pickup device 22. The lens section 18 of the image capture device 10 may be interchangeable or non-interchangeable.

The image pickup device 22 has many light receiving elements (photodiodes) two-dimensionally arranged thereon, and a subject image formed on a light receiving surface of each photodiode is converted into a signal voltage (or electrical charge) of an amount corresponding to an amount of its incident light.

[Image Pickup Device]

Figure 2:
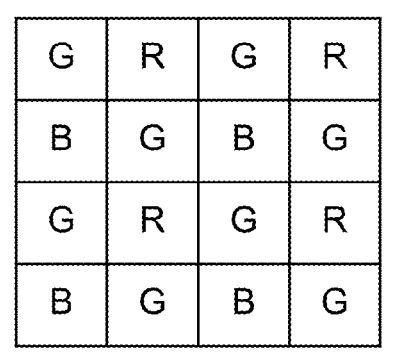

FIG. 2 is an illustration showing a form of the image pickup device 22, and particularly shows regarding the color filter array arranged on the light receiving surface of the image pickup device 22. Each photodiode provided with each color filter is a pixel, and data output from each photodiode is pixel data (pixel signal).

The color filter array on the image pickup device 22 shown in FIG. 2 is generally called the Bayer array. Here, the Bayer array refers to a color filter array in which a color to be a main component of a luminance signal requiring high resolution is checkerwise arranged and the rest of the array has therein two colors checkerwise arranged as color information components relatively not requiring the resolution. A specific example of the Bayer array may include, as shown in FIG. 2, a color filter array in which a color filter (G filter) of green (G) having a large ratio contributing to the luminance signal is checkerwise arranged, and a color filter (R filter) of red (R) and a color filter (B filter) of blue (B) are checkerwise arranged in the rest of the array.

A signal electrical charge accumulated in the image pickup device 22 of the above configuration is read out as a voltage signal depending on the signal electrical charge on the basis of a readout signal added from the device controller 16. The voltage signal read out from the image pickup device 22 is added to an A/D converter 24, sequentially converted in the A/D converter 24 into a digital R, G, or B signal (pixel data) corresponding to the color filter array, and temporarily stored in the memory unit 26.

The memory unit 26 includes a SDRAM (Synchronous Dynamic Random Access Memory) that is a volatile memory, an EEPROM (Electronically Erasable and Programmable Read Only Memory) that is a rewritable and non-volatile memory, and the like, and the SDRAM is used as a work area for executing a program by the CPU 12, or as a storage area for transiently holding a digital image signal which is captured and obtained. On the other hand, the EEPROM has stored therein a camera control program including an image processing program, defect information concerning the pixel in the image pickup device 22, and, various parameters, tables and the like used for the image processing or the like.

The image processor 28 subjects the digital image signal temporarily stored in the memory unit 26 to a predetermined signal processing such as white balance correction, gamma correction processing, demosaicing process, RGB/YC conversion, contour correction, chromatic aberration correction, blurring correction and the like. The image processing device (image processor) 28 according to the invention is described later in detail.

The image data processed by the image processor 28 is encoded by an encoder 30 into data for displaying on a screen and output via a driver 32 to the display unit 25 disposed on a back side of the camera. This allows the subject image to be continuously displayed on a display screen of the display unit 25.

When the shutter button in the operation unit 14 is pressed down at the first stage (halfway press), the CPU 12 starts an AF (Automatic Focus) operation and an AE (Automatic Exposure) operation, and moves the focus lens of the lens section 18 via the device controller 16 in a light axis direction to control the focus lens to be positioned at a focusing position.

In halfway pressing the shutter button, the CPU 12 calculates brightness of the subject (imaging Ev value) on the basis of the image data output from the A/D converter 24 to determine exposure conditions (aperture value, shutter speed) based on the imaging Ev value.

After the AE operation and the AF operation end, when the shutter button is pressed down at the second stage (full press), the diaphragm, the shutter 20, and an electrical charge accumulation period in the image pickup device 22 are controlled based on the above determined exposure conditions to carry out main image capturing. The image data of an RGB mosaic image (image corresponding to the color filter array shown in FIG. 2) obtained by A/D-converting data by the A/D converter 24, the data being read out from the image pickup device 22 in the main image capturing, is transiently stored in the memory unit 26.

The image data transiently stored in the memory unit 26 is properly read out by the image processor 28, and subjected in the image processor 28 to a predetermined signal processing including the white balance correction, gamma correction, demosaicing process, RGB/YC conversion, contour correction, color correction and the like. The image data (YC data) obtained by the RGB/YC conversion is compressed in accordance with a predetermined compression format (e.g., JPEG (Joint Photographic Experts Group) method), and the compressed image data is recorded in the internal memory or the external memory in a predetermined image file format (e.g., Exif (Exchangeable image file format) file) format.

The color filter array on the image pickup device 22 used for the invention is not limited to that shown in FIG. 2. The various color filter arrays may be employed so long as the effect exerted by the invention is not inhibited.

The color filter may further include a color filter of a color most contributing to the luminance, in addition to of red, green, and blue. For example, a color most contributing to the luminance may include white (transparent) and the like.

[First Embodiment of Image Processing Device]

Figure 3:
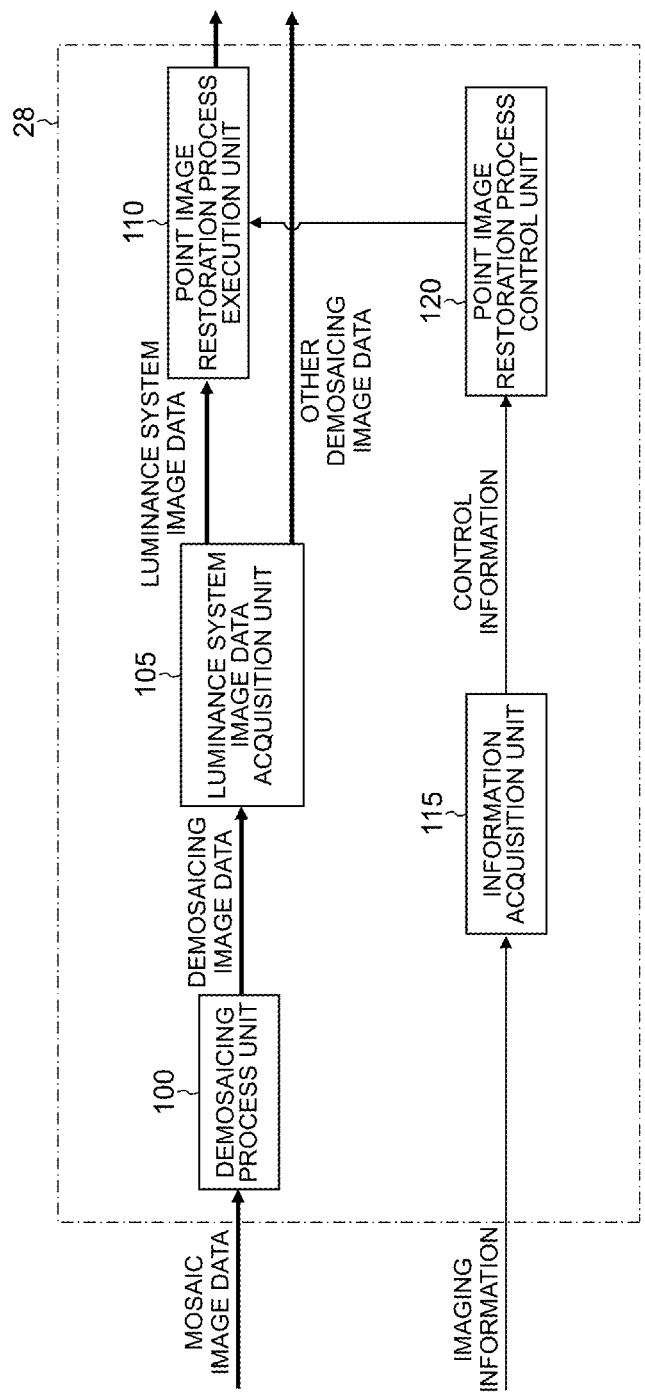
FIG. 3 is a main part block diagram showing a first embodiment of an image processing device as another aspect of the invention.

FIG. 3 is a main part block diagram showing an internal configuration of a first embodiment of the image processing device (image processor) 28 shown in FIG. 1.

The image processing device 28 shown in FIG. 3 includes a demosaicing process unit (device) 100 that performs the demosaicing process on mosaic image data output from the image pickup device 22 to generate demosaicing image data, a luminance system image data acquisition unit (device) 105 that acquires luminance system image data as image data regarding luminance on the basis of the demosaicing image data obtained by the demosaicing process unit 100, a point image restoration process execution unit (device) 110 that executes a point image restoration process on the luminance system image data acquired by the luminance system image data acquisition unit (device) 105, an information acquisition unit (device) 115 that acquires control information concerning execution of the point image restoration process on the basis of imaging information in imaging a subject, and a point image restoration process control unit (device) 120 that controls a processing operation of the point image restoration process execution unit 110 on the basis of the control information acquired by the information acquisition unit 115.

The image processor 28 includes also a white balance correction unit, gamma correction unit and the like, which are not shown in the FIG. 3 for convenience of explanation.

The demosaicing process unit 100 shown in FIG. 3 acquires the mosaic image data. Then, the demosaicing process unit 100 performs the demosaicing process on the acquired mosaic image data. Here, the mosaic image data, which is referred to as RAW data, is data output from the image pickup device 22. For example, in a case of the image pickup device 22 having the color filter shown in FIG. 2, a collection of color data corresponding to the color filter shown in FIG. 2 is output from the image pickup device 22. The demosaicing process unit 100 may determine a correlated direction in plural pixel signals constituting the mosaic image data on the basis of the color data in the mosaic image data having the highest contribution ratio for acquiring the luminance signal. Further, the demosaicing process unit 100 may perform a process of detecting an edge in the mosaic image data on the basis of the color data in the mosaic image data having the highest contribution ratio for acquiring the luminance signal. Here, the color data in the mosaic image data having the highest contribution ratio for acquiring the luminance signal refers to, for example, the pixel data corresponding to the G filter.

Moreover, the demosaicing process here refers to a process in which an interpolation process is performed using pixel data of plural pixels surrounding a target pixel to give an R, G, or B signal value to the target pixel.

Specifically, color information of RGB all is calculated (simultaneously converted) for each pixel from the R, G, B mosaic image involved by the color filter array of a single-plate color image pickup device. The demosaicing process is also referred to as the demosaicing process, synchronization process, and color synthesis process. The demosaicing process unit 100 subjects the mosaic image data to the demosaicing process to generate the demosaicing image data.

The luminance system image data acquisition unit 105 shown in FIG. 3 acquires the demosaicing image data from the demosaicing process unit 100 to acquire the luminance system image data on the basis of the demosaicing image. Here, the luminance system image data refers to various pieces of data having information concerning the luminance of the captured image. For example, examples of the luminance system image data include a value of a luminance signal Y in a color space represented by Y, Cb, and Cr, a value of a luminance signal Y in a color space represented by Y, Pb, and Pr, and data having the highest contribution ratio for acquiring the luminance signal. A value of a luminance signal Y in a color space represented by Y, Cb, and Cr may be approximately expressed in [Formula 1], and a value of a luminance signal Y in a color space represented by Y, Pb, and Pr may be approximately expressed in [Formula 2]. It can be said that the luminance signals Y found according to [Formula 1] and [Formula 2] have G color data as the data having the highest contribution ratio for acquiring the luminance signal.

$$Y=0.3R+0.6G+0.1B \quad \text{[Formula 1]}$$

$$Y=0.2R+0.7G+0.1B \quad \text{[Formula 2]}$$

The luminance system image data acquired by the luminance system image data acquisition unit 105 is forwarded to the point image restoration process execution unit 110.

The point image restoration process execution unit 110 shown in FIG. 3 executes point image restoration process on the luminance system image data. The point image restoration process execution unit 110 is controlled by the point image restoration process control unit 120.

Next, a description is given of the point image restoration process executed by the point image restoration process execution unit 110. Assuming that a blurred image obtained by capturing a point image is represented by g(x, y), an original point image is represented by f(x, y), and a point spread function (PSF) is represented by h(x, y), a relationship among them can be expressed in the formula below.

$$g(x,y)=h(x,y)*f(x,y) \quad \text{[Formula 3]}$$

where, "*" expresses convolution.

The value of h(x, y) (that is, the point spread function (PSF)) in [Formula 3] is found on the basis of the above blurred image g(x, y) obtained by capturing the point image.

Next, an inverse function of the obtained point spread function (PSF) is found. Assuming the inverse function is represented by R(x, y), the phase-modulated image g(x, y) is subjected to a convolution process with R(x, y) as shown in a formula below to obtain a restored image corresponding to the original image f(x, y) (point image restoration process).

$$g(x,y)*R(x,y)=f(x,y) \quad \text{[Formula 4]}$$

The R(x, y) is referred to as a restoration filter. For the restoration filter, there may be used at least mean square filter (Wiener filter) to minimize a mean square error between the original image and the restored image, limited deconvolution filter, recursive filter, homomorphic filter and the like. In the invention, one or more restoration filter are stored in the point image restoration process execution unit 110.

The point image restoration process execution unit 110 executes the point image restoration process on the luminance system image data forwarded from the luminance system image data acquisition unit 105 by way of the restoration filter generated as described above.

Figure 4:
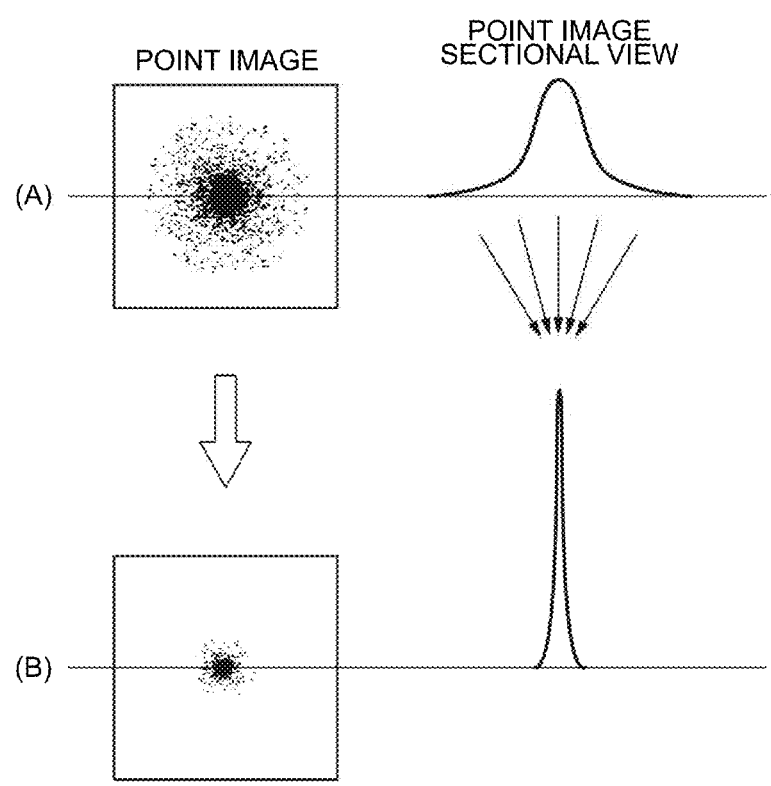
FIG. 4 is an illustration showing a state of a point image restored through the point image restoration process.

In other words, the point image (optical image) passing through the imaging lens is formed into an image as a large point image (blurred image) on the image pickup device 22 as shown in (A) portion of FIG. 4, and then, restored to a small point image (high resolution image) as shown in (B) portion in FIG. 4 through the point image restoration process in the point image restoration process execution unit 110.

The information acquisition unit 115 shown in FIG. 3 acquires the imaging information to generate (acquire) the control information having information concerning whether or not the point image restoration process is executed, and forwards the control information to the point image restoration process control unit 120. The information the control information has is not limited to the information concerning whether or not the point image restoration process is executed. For example, the control information may include information concerning that the point image restoration process is weakly executed, that the point image restoration process is executed with strength thereof being adjusted depending on the generation degree of the aliasing due to the chromatic aberration, and the like.

The imaging information includes various pieces of information concerning the imaging condition of the subject. Examples of the imaging information include, for example, information of a lens used in imaging (kind of lens, maximum aperture value), conditions with which a subject is imaged (aperture value, focal length, subject distance, etc.).

Figure 5:
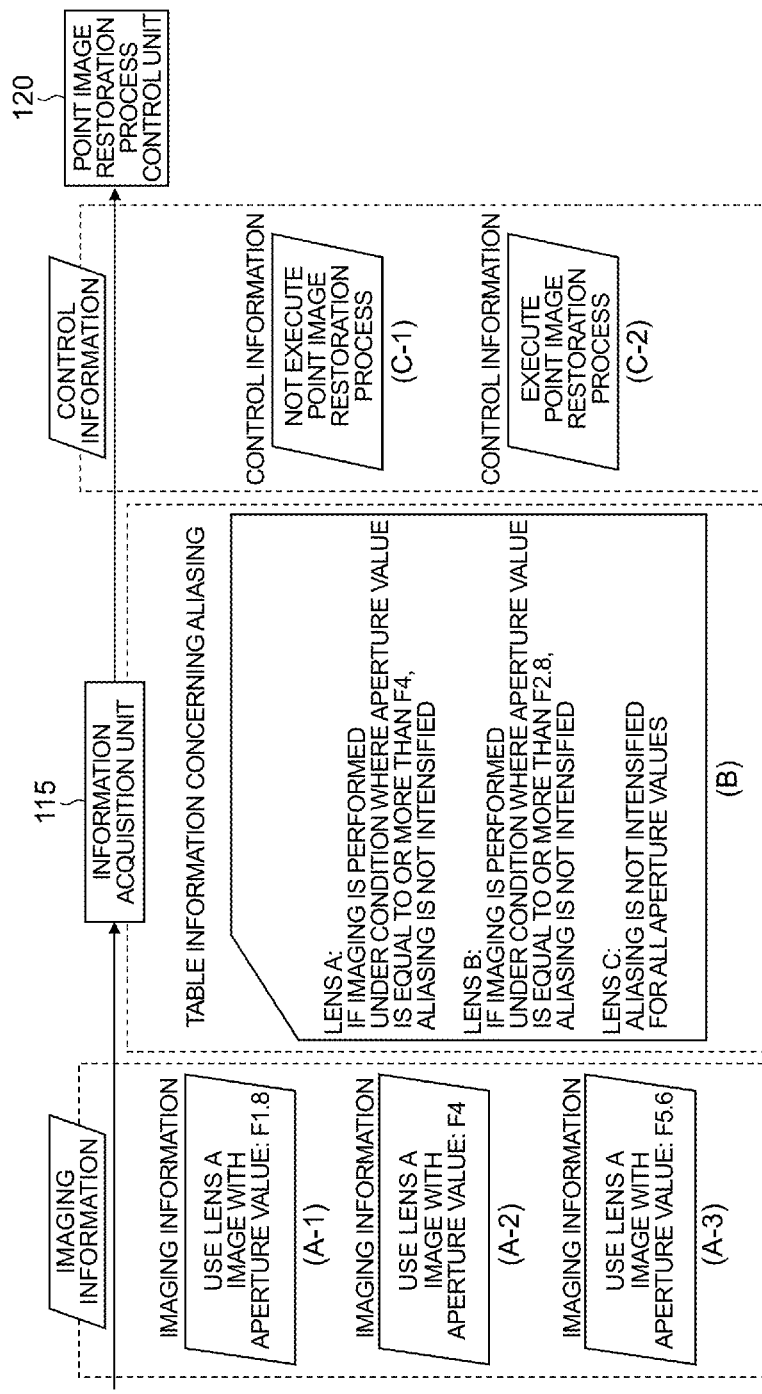
FIG. 5 is an illustration explaining an example concerning generation of control information by an information acquisition unit.

FIG. 5 is an illustration explaining that the information acquisition unit 115 generates control information (C-1 or C-2) on the basis of imaging information (A-1, A-2, or A-3), and sends the control information (C-1 or C-2) to the point image restoration process control unit 120. Specific examples of the imaging information in FIG. 5 include (A-1) in a case where a lens A is used and the aperture value is set to F1.8 to perform imaging, (A-2) in a case where the lens A is used and the aperture value is set to F4 to perform imaging, and that in a case where the lens A is used and the aperture value is set to F5.6 to perform imaging.

First, a description is given of a case where the information acquisition unit 115 receives, as the imaging information, information (A-1) that the lens A is used and the aperture value is set to F1.8 to perform imaging. The information acquisition unit 115 having received the information (A-1) that the lens A is used and the aperture value is set to F1.8 to perform imaging refers to table information (B) concerning the aliasing stored in the information acquisition unit 115 and the acquired imaging information (A-1). In other words, the imaging information is (A-1) that the lens A is used and the aperture value is set to F1.8 to perform imaging, and the table information (B) concerning the aliasing describes "if imaging is performed under a condition where the lens A is used and the aperture value is equal to or more than F4, the aliasing is not intensified", and therefore, the information acquisition unit 115 determines that the aliasing is to be intensified in a picture imaged with the imaging information (A-1). The information acquisition unit 115 sends control information (C-1) that the point image restoration process is not executed to the point image restoration process control unit 120 on the basis of the determination that the aliasing is to be intensified.

Next, a description is given of a case where the information acquisition unit 115 receives, as the imaging information, information (A-2) that the lens A is used and the aperture value is set to F4 to perform imaging. The information acquisition unit 115 having received the information (A-2) that the lens A is used and the aperture value is set to F4 to perform imaging refers to table information (B) concerning the aliasing stored in the information acquisition unit 115 and the acquired imaging information (A-2). In other words, the imaging information is (A-2) that the lens A is used and the aperture value is set to F4 to perform imaging, and the table information (B) concerning the aliasing describes "if imaging is performed under a condition where the lens A is used and the aperture value is equal to or more than F4, the aliasing is not intensified", and therefore, the information acquisition unit 115 determines that the aliasing is not to be intensified in a picture imaged with the imaging information (A-2). The information acquisition unit 115 sends control information (C-2) that the point image restoration process is executed to the point image restoration process control unit 120 on the basis of the determination that the aliasing is not to be intensified.

Next, a description is given of a case where the information acquisition unit 115 receives, as the imaging information, information (A-3) that the lens A is used and the aperture value is set to F5.6 to perform imaging. The information acquisition unit 115 having received the information (A-3) that the lens A is used and the aperture value is set to F5.6 to perform imaging refers to table information (B) concerning the aliasing stored in the information acquisition unit 115 and the acquired imaging information (A-3). In other words, the imaging information is (A-3) that the lens A is used and the aperture value is set to F5.6 to perform imaging, and the table information (B) concerning the aliasing describes "if imaging is performed under a condition where the lens A is used and the aperture value is equal to or more than F4, the aliasing is not intensified", and therefore, the information acquisition unit 115 determines that the aliasing is not to be intensified in a picture imaged with the imaging information (A-3). The information acquisition unit 115 sends control information (C-2) that the point image restoration process is executed to the point image restoration process control unit 120 on the basis of the determination that the aliasing is not to be intensified.

Figure 6:
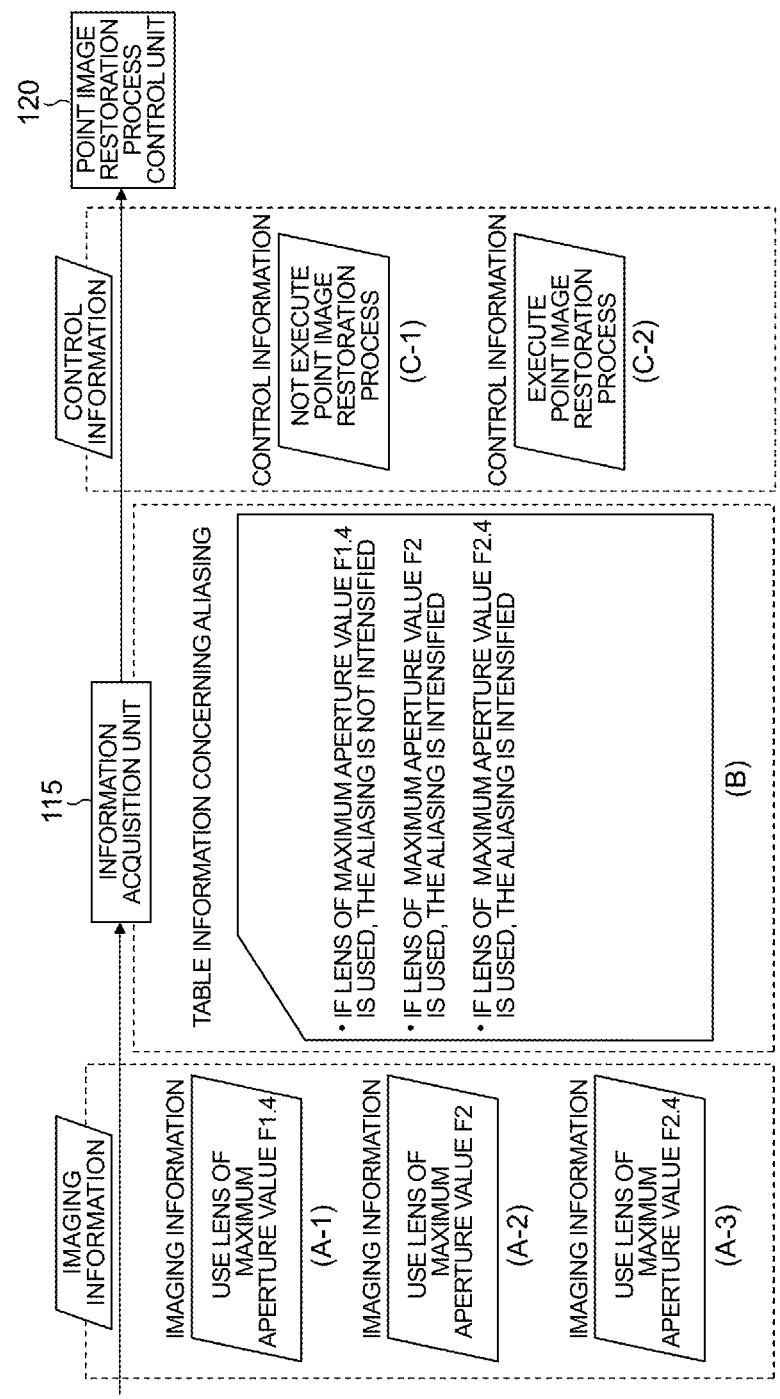
FIG. 6 is an illustration explaining another example concerning generation of control information by the information acquisition unit.

FIG. 6 is an illustration explaining that the information acquisition unit 115 further generates control information (C-1 or C-2) on the basis of imaging information (A-1, A-2, or A-3) different in kind from FIG. 5, and sends the control information (C-1 or C-2) to the point image restoration process control unit 120. Specific examples of the imaging information in FIG. 6 include (A-1) in a case where the lens of maximum aperture value F1.4 is used to perform imaging, (A-2) in a case where the lens of maximum aperture value F2 is used to perform imaging, and that in a case where the lens of maximum aperture value F2.4 is used to perform imaging.

First, a description is given of a case where the information acquisition unit 115 receives, as the imaging information, information (A-1) that the lens of maximum aperture value F1.4 is used to perform imaging. The information acquisition unit 115 having received the information (A-1) that the lens of maximum aperture value F1.4 is used to perform imaging refers to the table information (B) concerning the aliasing stored in the information acquisition unit 115 and the acquired imaging information (A-1). In other words, the imaging information is (A-1) that the lens of maximum aperture value F1.4 is used to perform imaging, and the table information (B) concerning the aliasing describes "if the lens of maximum aperture value F1.4 is used, the aliasing is not intensified", and therefore, the information acquisition unit 115 determines that the aliasing is not to be intensified in a picture imaged with the imaging information (A-1). The information acquisition unit 115 sends control information (C-2) that the point image restoration process is executed to the point image restoration process control unit 120 on the basis of the determination that the aliasing is not to be intensified.

Next, a description is given of a case where the information acquisition unit 115 receives, as the imaging information, information (A-2) that the lens of maximum aperture value F2 is used to perform imaging. The information acquisition unit 115 having received the information (A-2) that the lens of maximum aperture value F2 is used to perform imaging refers to the table information (B) concerning the aliasing stored in the information acquisition unit 115 and the acquired imaging information (A-2). In other words, the imaging information is (A-2) that the lens of maximum aperture value F2 is used to perform imaging, and the table information (B) concerning the aliasing describes "if the lens of maximum aperture value F2 is used, the aliasing is intensified", and therefore, the information acquisition unit 115 determines that the aliasing is to be intensified in a picture imaged with the imaging information (A-2). The information acquisition unit 115 sends control information (C-1) that the point image restoration process is not executed to the point image restoration process control unit 120 on the basis of the determination that the aliasing is to be intensified.

Next, a description is given of a case where the information acquisition unit 115 receives, as the imaging information, information (A-3) that the lens of maximum aperture value F2.4 is used to perform imaging. The information acquisition unit 115 having received the information (A-3) that the lens of maximum aperture value F2.4 is used to perform imaging refers to the table information (B) concerning the aliasing stored in the information acquisition unit 115 and the acquired imaging information (A-3). In other words, the imaging information is (A-3) that the lens of maximum aperture value F2.4 is used to perform imaging, and the table information (B) concerning the aliasing describes "if the lens of maximum aperture value F2.4 is used, the aliasing is intensified", and therefore, the information acquisition unit 115 determines that the aliasing is to be intensified in a picture imaged with the imaging information (A-2). The information acquisition unit 115 sends control information (C-1) that the point image restoration process is not executed to the point image restoration process control unit 120 on the basis of the determination that the aliasing is to be intensified.

The point image restoration process control unit 120 shown in FIG. 3 acquires the control information sent from information acquisition unit 115 to control the point image restoration process execution unit 110 on the basis of the control information. Specifically, the point image restoration process control unit 120 determines the information concerning whether or not the point image restoration process is executed included in the acquired control information to control the point image restoration process execution unit 110. If the point image restoration process control unit 120 determines that the point image restoration process is not executed on the basis of the control information, the point image restoration process control unit 120 inhibits the point image restoration process execution unit 110 from executing the point image restoration process on the luminance system image data. On the other hand, if the point image restoration process control unit 120 determines that the point image restoration process is executed on the basis of the control information, the point image restoration process control unit 120 controls the point image restoration process execution unit 110 to execute the point image restoration process on the luminance system image data. The chromatic aberration (chromatic aberration of magnification and axial chromatic aberration) is caused by that a difference in a magnitude of image leads to a difference in a size of image for each color, and a difference in a light wavelength leads to a difference in a focal length of the lens for each color. One of criteria for determination that chromatic aberration is generated may be such that the chromatic aberration is determined to be generated when data for each color deviates by more than a kernel size (minimum array pattern) of the color filter array.

Here, a description is given that the aliasing due to the chromatic aberration is intensified by executing the point image restoration process with reference to FIG. 7, FIG. 8, FIG. 9, and FIG. 10. FIG. 7, FIG. 8, FIG. 9, and FIG. 10 show examples where a color filter the Bayer array is used.

Figure 7:
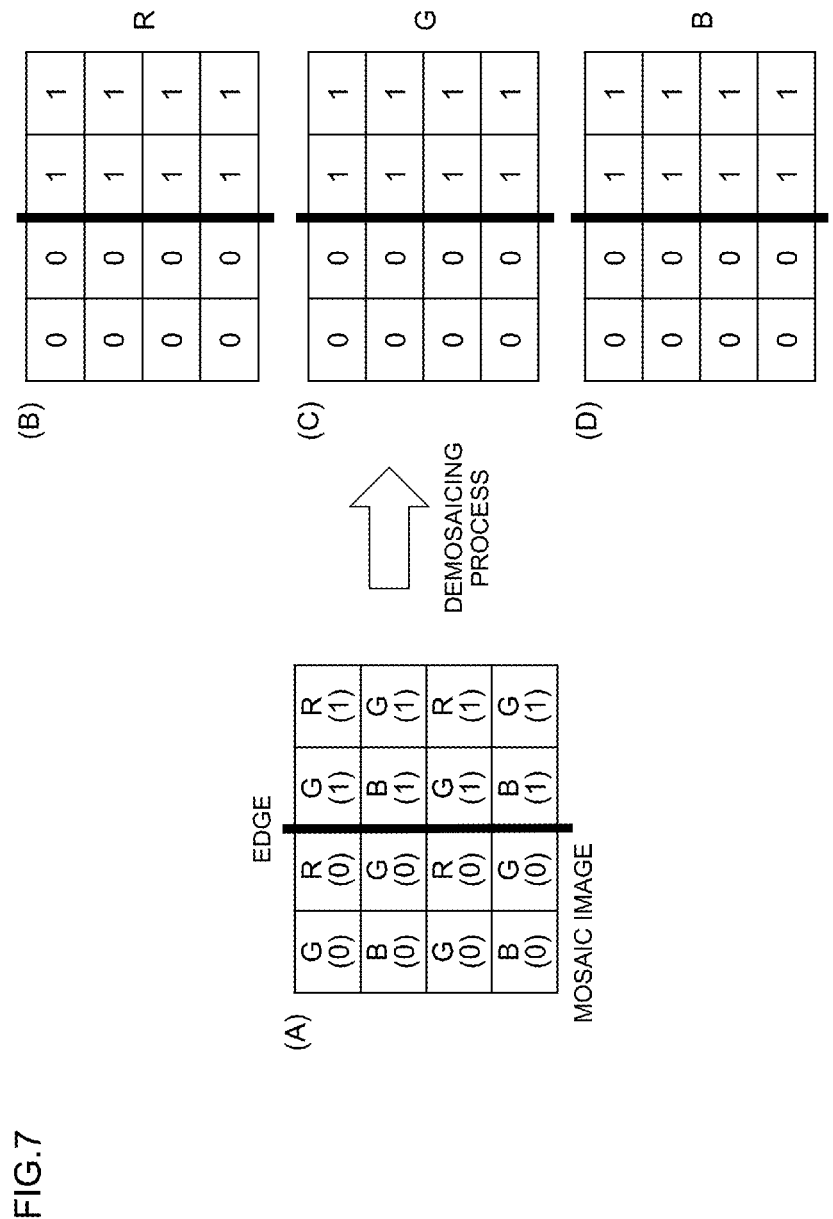
FIG. 7 is an illustration explaining a demosaicing process on an image with no generated aliasing due to chromatic aberration.

FIG. 7 shows a situation of the demosaicing process in a case where the aliasing due to the chromatic aberration is not generated. (A) portion of FIG. 7 shows a mosaic image (RAW data) of 4 pixels data (height)×4 pixels data (width) gathered. The mosaic image data shown in (A) portion of FIG. 7 represents an image having an edge in a height direction. In other words, 4 pixels data (height)×2 pixels data (width) on the left side of (A) portion of FIG. 7 with respect to the edge interposed has R, G, or B pixel data of an output value "0" gathered. On the other hand, 4 pixels data (height)×2 pixels data (width) on the right side of (A) portion of FIG. 7 with respect to the edge interposed has R, G, or B pixel data of an output value "1" gathered.

(B) portion, (C) portion, and (D) portion of FIG. 7 show the mosaic image in (A) portion of FIG. 7 is subjected to the demosaicing process to generate three planes of color data of R, G, B. In the mosaic image in (A) portion of FIG. 7, the output values of the pixel data are classified into 0 and 1 with the edge as a border, and thus, also in three planes of color data in (B) portion, (C) portion, and (D) portion of FIG. 7 after the demosaicing process, the output values of the pixel data are classified into 0 and 1 with the edge as a border.

Figure 8:
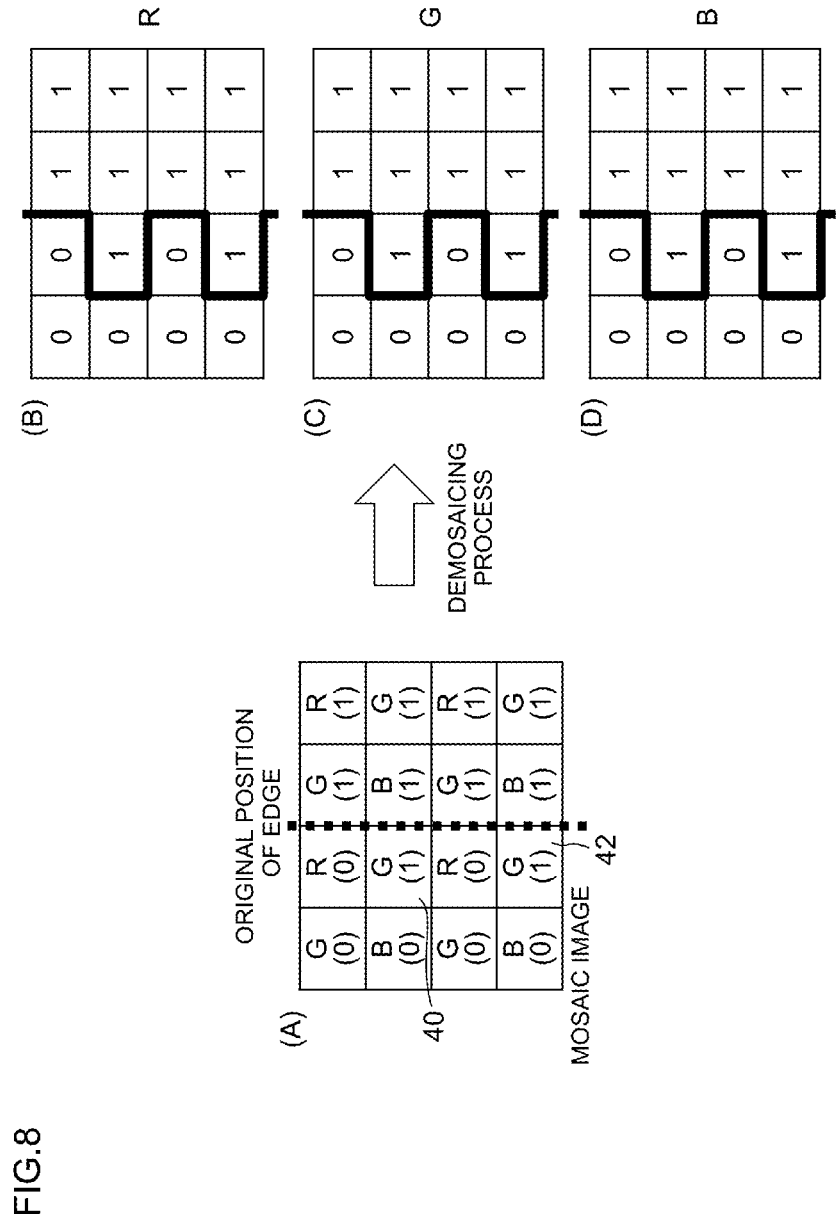
FIG. 8 is an illustration explaining a demosaicing process on an image with generated aliasing due to the chromatic aberration.

On the other hand, FIG. 8 shows a situation of the demosaicing process in a case where the aliasing caused by the chromatic aberration and demosaicing process is occurring. (A) portion of FIG. 8 should have in nature the same data as (A) portion of FIG. 7, but has data different from (A) portion of FIG. 7 owing to the chromatic aberration. In other words, (A) portion of FIG. 8 shows a mosaic image (RAW data) of 4 pixels data (height)×4 pixels data (width) gathered, but 4 pixels data (height)×2 pixels data (width) on the left side of (A) portion of FIG. 8 with respect to the edge interposed, as is in (A) portion of FIG. 7, does not throughout have the output values "0" differently from (A) portion of FIG. 7, but the G pixel data adjacent to the original edge represents shows the output value "1" owing to the chromatic aberration.

Figure 9:
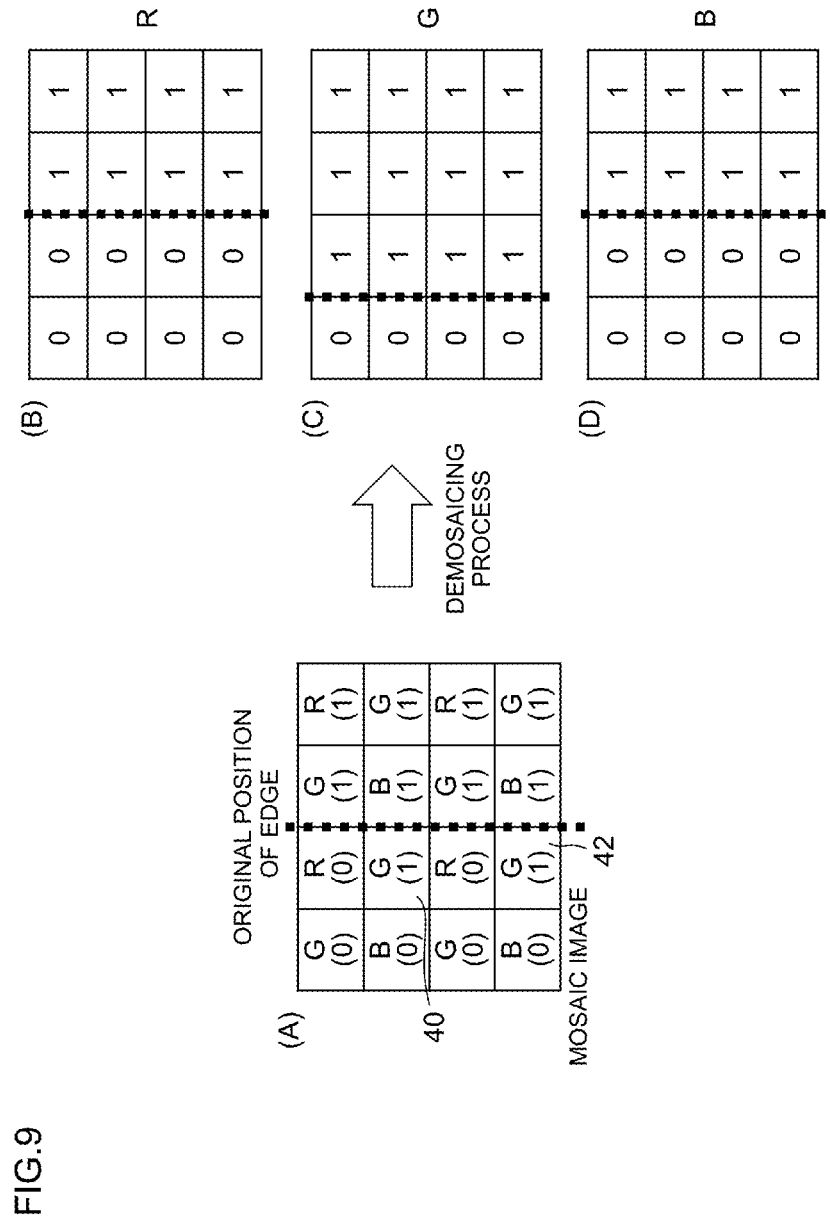
FIG. 9 is an illustration showing an original position of an edge in a case where the demosaicing process is performed on an image shown in (A) portion of FIG. 8.

In the Bayer array, a sampling frequency for a G pixel is higher than those for an R pixel and B pixel, and G pixel data has the contribution ratio with respect to the luminance system higher than the pixel data of an R pixel and B pixel. For this reason, the demosaicing process generally includes a process in which the correlated direction in the image data is determined on the basis of the G pixel data, and the interpolation process in which an edge that is detected on the basis of the determined correlated direction is considered. The mosaic image in (A) portion of FIG. 8 has color deviation caused by the chromatic aberration (the pixel data of the G pixels is "1") (see a reference numeral 40 and a reference numeral 42 in FIG. 8). If the mosaic image shown in (A) portion of FIG. 8 is subjected to the demosaicing process, edges are erroneously detected owing to the pixel data of the G pixels designated by the reference numeral 40 and the reference numeral 42, and the aliasing may be generated, for example, as shown in (B) portion, (C) portion, and (D) portion of FIG. 8 as the color data after the demosaicing process. In other words, the edge in (A) portion of FIG. 8 should be ideally reproduced as a straight line in the height direction in nature by the demosaicing process as shown in (B) portion, (C) portion, and (D) portion of FIG. 9, but a concave and convex step-shaped difference (difference between output values) which does not exist in nature may be generated in any color data of R, G, and B near the edge owing to the aliasing caused by the chromatic aberration and demosaicing process, as shown in (B) portion, (C) portion, and (D) portion of FIG. 8. Here, the mosaic image shown in (A) portion of FIG. 9 is the same as the mosaic image shown in (A) portion of FIG. 8.

Figure 10:
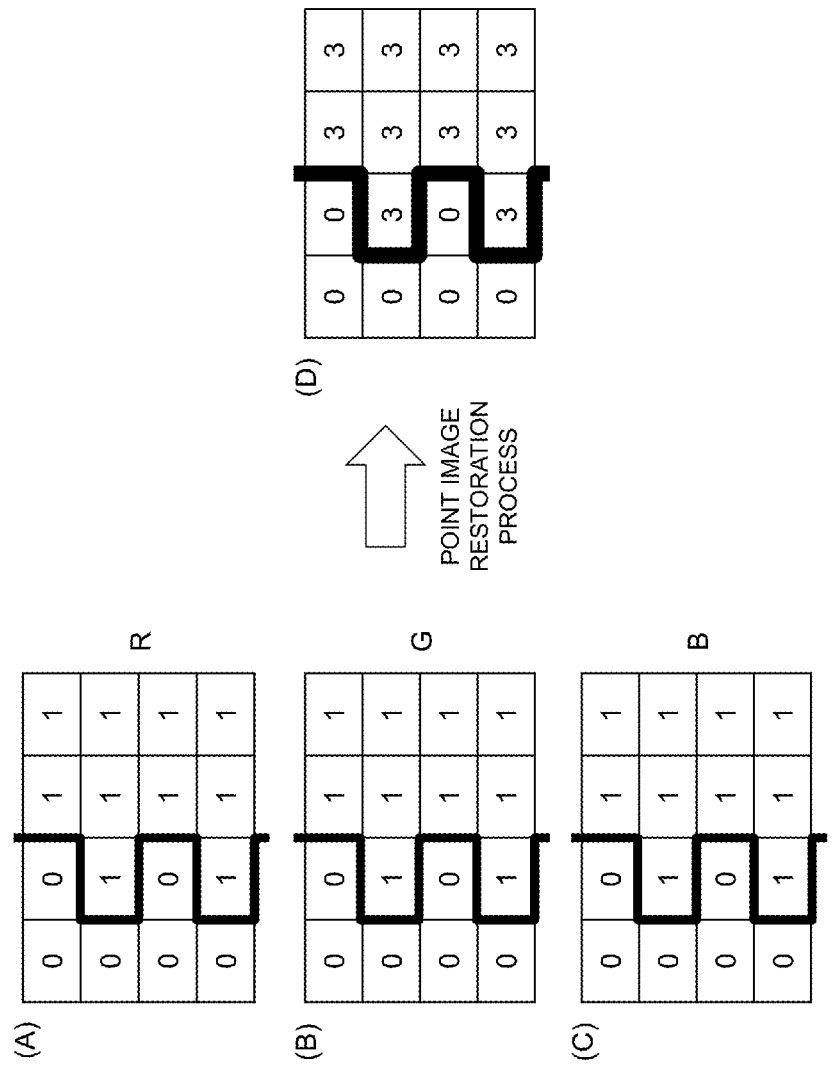
FIG. 10 is an illustration explaining that the aliasing due to the chromatic aberration is intensified through the point image restoration process.

FIG. 10 shows a phenomenon where the execution of the point image restoration process causes the aliasing due to the chromatic aberration and demo saicing process to be intensified. (A) portion, (B) portion, and (C) portion of FIG. 10 are three planes of color data respectively corresponding to (B) portion, (C) portion, and (D) portion of FIG. 8. In (A) portion, (B) portion, and (C) portion of FIG. 10, the edge which is originally a straight line is made concave and convex owing to the aliasing due to the chromatic aberration and demosaicing process.

(D) portion of FIG. 10 shows a case where the point image restoration process is executed on the G color data ((B) portion of FIG. 10) that is one example of the luminance system data. As shown in (D) portion of FIG. 10, the concave and convex edge in the G color data ((B) portion of FIG. 10) is intensified through the point image restoration process. In other words, the pixel data representing the output value "1" shown in (B) portion of FIG. 10 is amplified to have the output value of the pixel data "3" through the point image restoration process ((D) portion of FIG. 10), and the pixel data representing the output value "0" shown in (B) portion of FIG. 10 remains to have the output value of the pixel data "0" even after the point image restoration process is performed. Therefore, in (D) portion of FIG. 10 on which the point image restoration process is executed, the aliasing due to the chromatic aberration is intensified (larger step-shaped difference is generated).

In this way, in the point image restoration process executed on the luminance system data after the demosaicing process, since the demosaicing process includes a process in which the correlated direction in the image data is determined on the basis of the G pixel data, and the interpolation process in which an edge that is detected on the basis of the determined correlated direction is considered, the chromatic aberration generated in the optical system likely causes the aliasing due to the demosaicing process, bringing a harmful result that this aliasing is intensified through the restoration process. This harmful result may be considered to be inherent to the point image restoration process executed on the luminance system data after the demosaicing process, because in a system in which the restoration process is executed on each piece of the color data of R, G, and B by way of an optimal restoration filter for each color of R, G, and B, the chromatic aberration can be also restored by executing the point image restoration process on each piece of the color data of R, G, and B.

Figure 11:
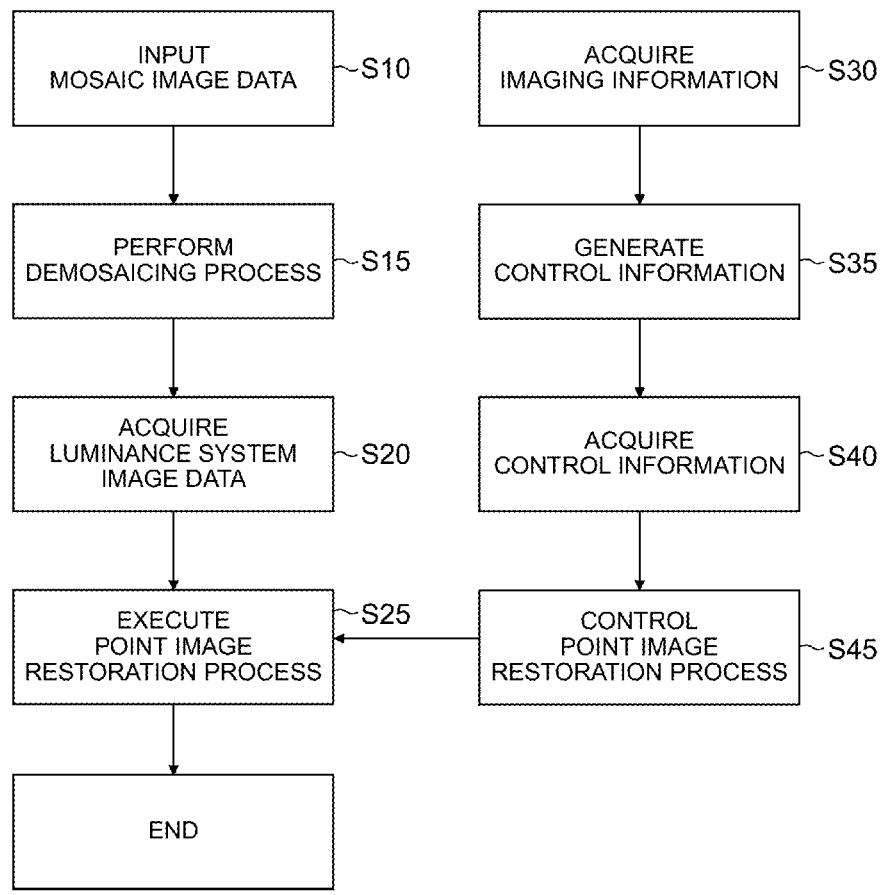
FIG. 11 is an illustration showing an operation flow in the first embodiment of the image processing device.

FIG. 11 shows an operation flow of the image processing device 28. First, mosaic image data is input to the demosaicing process unit 100 (step S10). Then, the demosaicing process is performed on the mosaic image data by the demosaicing process unit 100 (step S15) to generate demosaicing image data (demosaicing process step).

After that, the luminance system image data is acquired from the demosaicing image data by the luminance system image data acquisition unit 105 (step S20) (luminance system image data acquisition step). Then, the point image restoration process is executed on the luminance system image data by the point image restoration process execution unit 110 (step S25) (point image restoration process execution step).

On the other hand, the imaging information is acquired by the information acquisition unit 115 (step S30) (information acquisition step). Then, the control information is generated by the information acquisition unit 115 (step S35). After that, the control information is acquired by the point image restoration process control unit 120 (step S40). Then, the point image restoration process (point image restoration process execution step) is controlled by the point image restoration process control unit 120 so as to be executed by the point image restoration process execution unit 110 (point image restoration process control step).

[Point Image Restoration Process Control Example]

Figure 12:
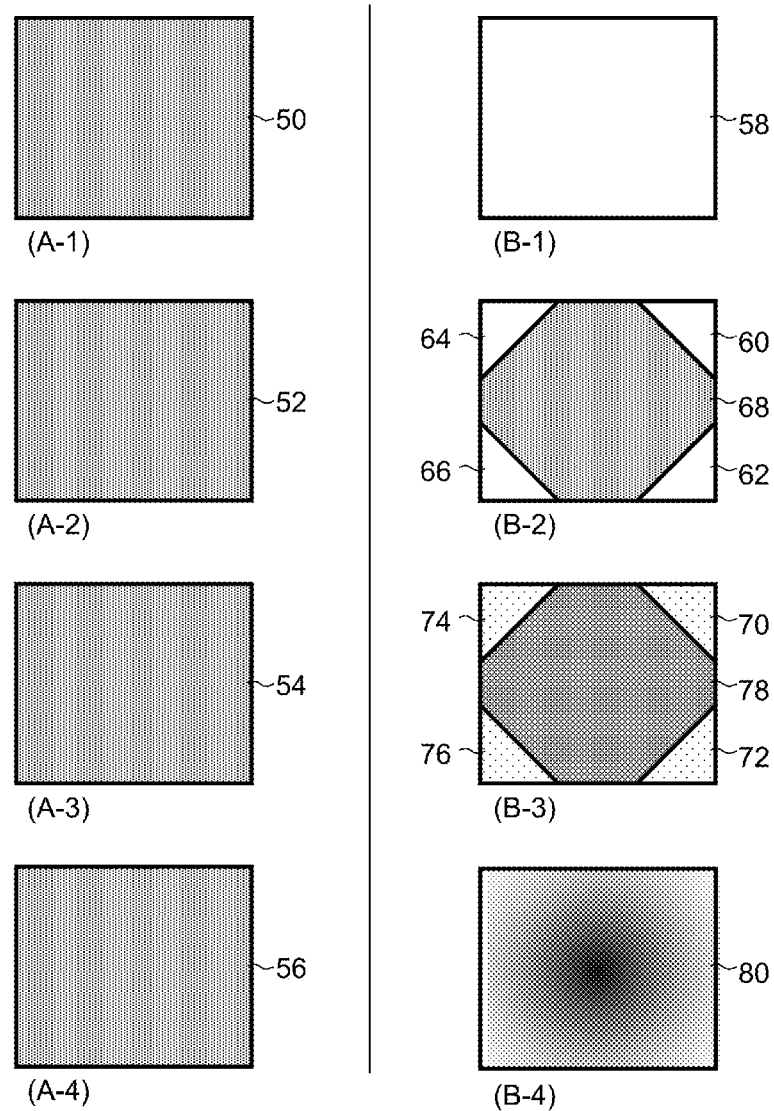
FIG. 12 is an illustration explaining a control example by the point image restoration process.

FIG. 12 is an illustration showing an example of control for the point image restoration process execution unit 110 performed by the point image restoration process control unit 120. Specifically, A-1 to A-4 each show an example of the point image restoration process execution on the luminance system image data in a case of the control information that the point image restoration process is executed. B-1 to B-4 each show an example in a case of the control information that the point image restoration process is not executed. Reference numerals 50, 52, 54, 56 68, and 78 designate portions having been subjected to the point image restoration process. Reference numerals 58, 60, 62, 64, and 66 designate portions not subjected to the point image restoration process. Reference numerals 70, 72, 74, and 76 designate portions (regions) having been subjected to the point image restoration process to an extent weaker than the point image restoration process executed on the portions 50, 52, 54, 56, 68, and 78. Reference numeral 80 designates a portion in a case where the point image restoration process is executed with strength of the point image restoration process being gradually varied. The case of the reference numeral 80 shows that the point image restoration process is executed stronger relative to a color density.

<First Point Image Restoration Process Control Example>

A-1 of FIG. 12 shows a situation where the information acquisition unit 115 sends the control information that the point image restoration process is executed to the point image restoration process control unit 120, and the point image restoration process control unit 120 controls the point image restoration process execution unit 110 to execute the point image restoration process on the entire plane of the luminance system image data. On the other hand, B-1 of FIG. 12 shows a situation where the information acquisition unit 115 sends the control information that the point image restoration process is not executed to the point image restoration process control unit 120 and the point image restoration process control unit 120 inhibits the point image restoration process execution unit 110 from executing the point image restoration process on the luminance system image data. In the first point image restoration process control example, the point image restoration process control unit 120 switches the controls of the point image restoration process execution unit 110 depending on the control information, for example, between A-1 and B-1, as described above.

<Second Point Image Restoration Process Control Example>

A-2 of FIG. 12 shows a situation where the information acquisition unit 115 sends the control information that the point image restoration process is executed to the point image restoration process control unit 120, and the point image restoration process control unit 120 controls the point image restoration process execution unit 110 to execute the point image restoration process on the entire plane of the luminance system image data. On the other hand, in B-2 of FIG. 12, the information acquisition unit 115 sends the control information that the point image restoration process is not executed on a portion where the aliasing due to the chromatic aberration is intensified (aliasing intensified region) to the point image restoration process control unit 120. Then, the point image restoration process control unit 120 inhibits the point image restoration process execution unit 110 from executing the point image restoration process on the portion where the aliasing due to the chromatic aberration is intensified (aliasing intensified region) (see the reference numerals 60, 62, 64, and 66 in B-2 of FIG. 12), and controls the unit 110 to execute the point image restoration process on the portion of the rest (region other than the aliasing intensified region) (see the reference numeral 68 in B-2 of FIG. 12). In the second point image restoration process control example, the point image restoration process control unit 120 switches the controls of the point image restoration process execution unit 110 depending on the control information, for example, between A-2 and B-2, as described above.

<Third Point Image Restoration Process Control Example>

A-3 of FIG. 12 shows a situation where the information acquisition unit 115 sends the control information that the point image restoration process is executed to the point image restoration process control unit 120, and the point image restoration process control unit 120 controls the point image restoration process execution unit 110 to execute the point image restoration process on the entire plane of the luminance system image data. On the other hand, in B-3 of FIG. 12, the information acquisition unit 115 sends the control information that weaker point image restoration process is executed on the portion where the aliasing due to the chromatic aberration is intensified (aliasing intensified region) to the point image restoration process control unit 120. Then, the point image restoration process control unit 120 controls the point image restoration process execution unit 110 to execute weaker point image restoration process on the portion where the aliasing due to the chromatic aberration is intensified (aliasing intensified region) (see the reference numerals 70, 72, 74, and 76 in B-3 of FIG. 12), and controls the unit 110 to execute the point image restoration process stronger than the weaker point image restoration process on the portion of the rest (region other than the aliasing intensified region) (see the reference numeral 78 in B-3 of FIG. 12). In the third point image restoration process control example, the point image restoration process control unit 120 switches the controls of the point image restoration process execution unit 110 depending on the control information, for example, between A-3 and B-3.

<Fourth Point Image Restoration Process Control Example>

A-4 of FIG. 12 shows a situation where the information acquisition unit 115 sends the control information that the point image restoration process is executed to the point image restoration process control unit 120, and the point image restoration process control unit 120 controls the point image restoration process execution unit 110 to execute the point image restoration process on the entire plane of the luminance system image data. On the other hand, in B-4 of FIG. 12, the information acquisition unit 115 sends the control information that the strength of the point image restoration process is varied depending on a degree to which the aliasing due to the chromatic aberration is intensified (aliasing intensified degree) to the point image restoration process control unit 120. Then, the point image restoration process control unit 120 controls the point image restoration process execution unit 110 to vary the strength of the point image restoration process depending on the degree to which the aliasing due to the chromatic aberration is intensified (see B-4 of FIG. 12). In the fourth point image restoration process control example, the point image restoration process control unit 120 switches the controls of the point image restoration process execution unit 110 depending on the control information, for example, between A-4 and B-4, as described above. The control example by the point image restoration process control unit 120 is not limited to the above described control examples, but the execution of the point image restoration process can be made with taking into account the generation degree of the aliasing due to the chromatic aberration.

In the above point image restoration process control example, the aliasing intensified region may be a region having a high image height in the image. In the above point image restoration process control example, the aliasing intensified degree may become larger relative to the image height in some cases.

As described above, the point image restoration process control unit 120 can control and adjust the strength of the point image restoration process executed by the point image restoration process execution unit 110. Here, adjusting the strength of the point image restoration process refers to that the strength of the point image restoration process can be adjusted by adjusting a coefficient of the restoration filter.

Figure 13:
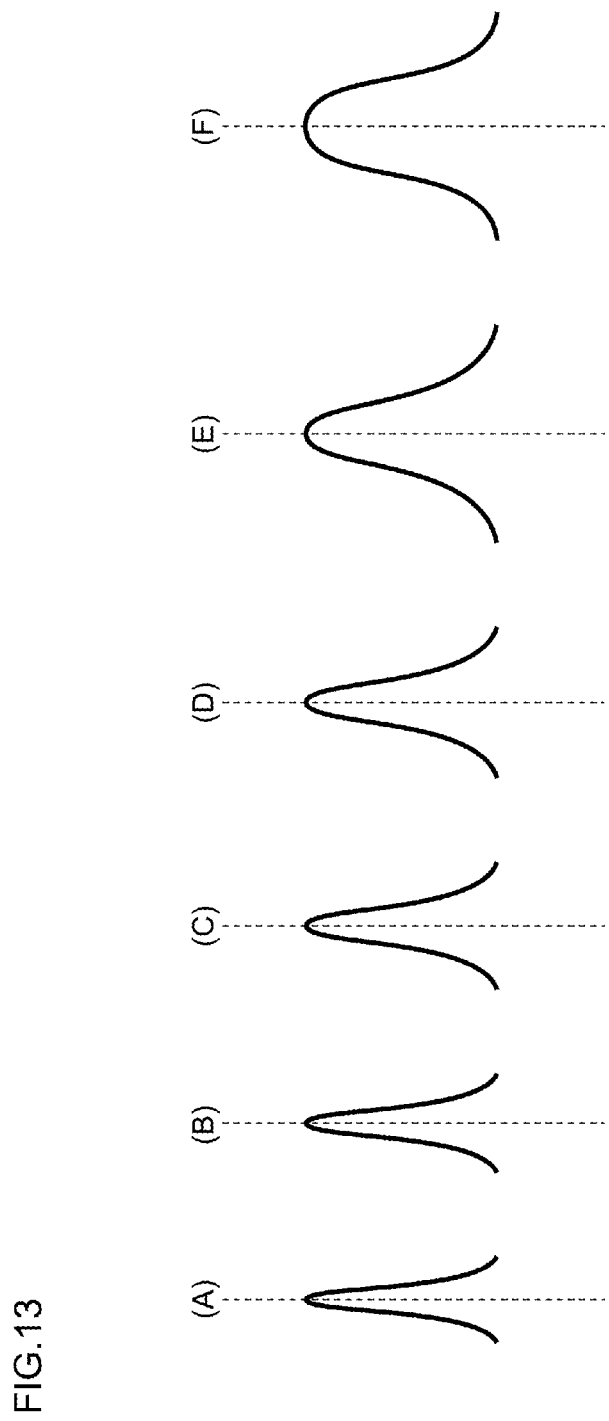
FIG. 13 is an illustration explaining adjustment of strength of the point image restoration process.

FIG. 13 shows image views of a plurality of point spread functions (PSF) A to F. As described above, the restoration filter is generated on the basis of these PSF.

As shown in FIG. 13, a broadening of the PSF gradually increases in the order of A, B, C, D, E, and F. Then, the point image restoration process by way of the restoration filter using the PSF of A the is a point image restoration process weaker than the point image restoration process by way of the restoration filter using the PSF having a broadening larger than the PSF of A (e.g., PSF of B).

For example, in the case of the third point image restoration process control example described above (A-3 and B-3 of FIG. 12), in a case where the aliasing due to the chromatic aberration is not intensified, or on the portion where the aliasing due to the chromatic aberration is not intensified, (reference numeral 78 in B-3 of FIG. 12), the point image restoration process execution unit 110 executes the point image restoration process using the restoration filter corresponding to F (in a case where the PSF of the lens used is the PSF shown in F of FIG. 13). In the case of the third point image restoration process control example described above, on the portion where the aliasing due to the chromatic aberration is intensified (aliasing intensified region), the point image restoration process execution unit 110 executes weaker point image restoration process using the restoration filter corresponding to the PSF shown in A of FIG. 13.

[Second Embodiment of Image Processing Device]

Figure 14:
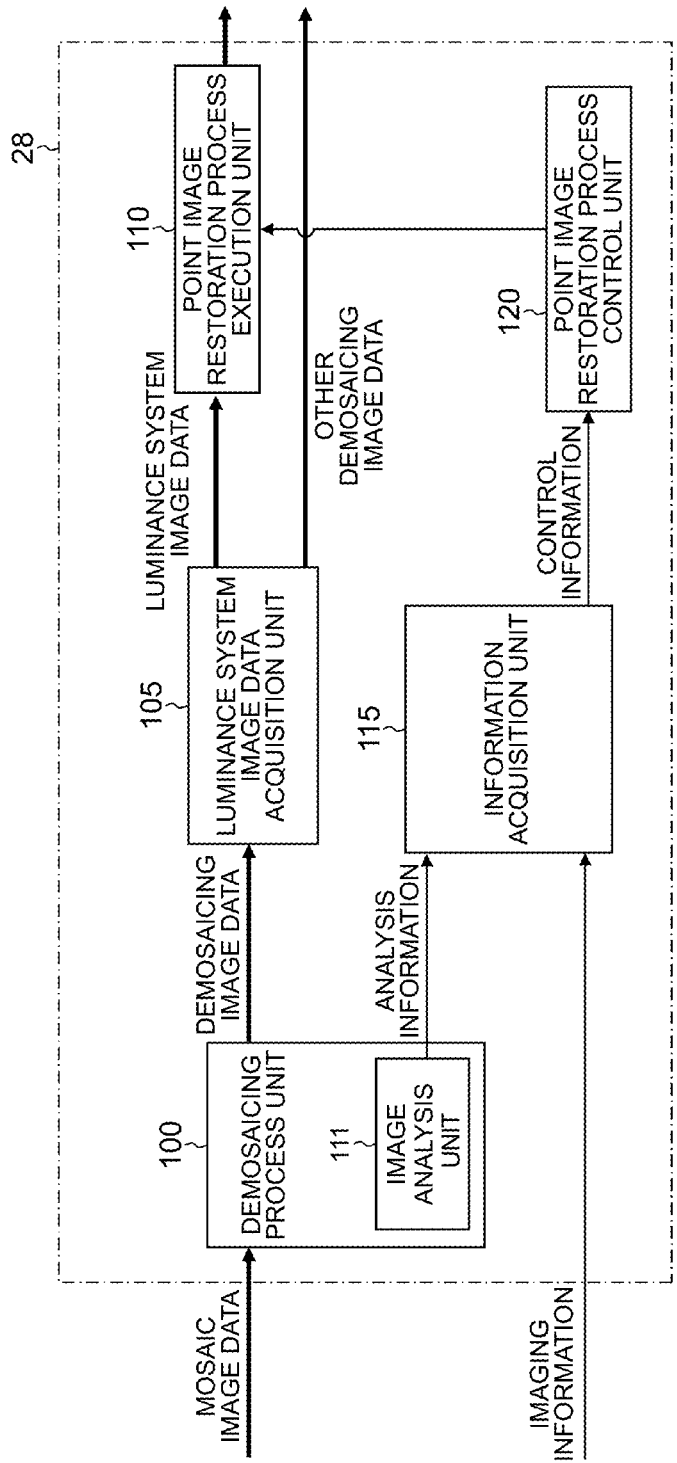
FIG. 14 is a main part block diagram showing a second embodiment of an image processing device.

FIG. 14 shows a second embodiment of the image processing device 28. The same parts as in the first embodiment of the image processing device 28 in FIG. 3 are designated by the same reference numerals and the description thereof is omitted. In comparing the second embodiment of the image processing device 28 with the first embodiment of the image processing device 28, the second embodiment of the image processing device 28 is different from the latter in that an image analysis unit 111 is added and that the information acquisition unit 115 acquires also analysis information to generate the control information.

The image processing device 28 shown in FIG. 14 includes the image analysis unit 111 within the demosaicing process unit 100. The image analysis unit 111 performs the image analysis on the mosaic image data before subjected to the demosaicing process by a demosaicing image processor or the demosaicing image data after subjected to a demosaicing image process. In the image processing device 28 shown in FIG. 14, the image analysis unit 111 is provided within the demosaicing process unit 100 to perform the image analysis on the mosaic image data or demosaicing image data, but not limited thereto. The image analysis may be performed on various pieces of data so long as the generation of the aliasing due to the chromatic aberration and the generation degree thereof can be analyzed.

Here, the image analysis refers to, as described using FIG. 7 to FIG. 10 as an example, identifying whether or not image data is mosaic image data in which the aliasing due to the chromatic aberration is intensified if the point image restoration process is executed, or whether or not image data is demosaicing image data in which the aliasing due to the chromatic aberration is intensified if the point image restoration process is executed. For example, the image analysis unit 111 finds a magnitude of contrast in the mosaic image data or the demosaicing image data in order to analyze whether or not the image data is the mosaic image data in which the aliasing is intensified if the point image restoration process is executed, whether or not the image data is the demosaicing image data in which the aliasing is intensified if the point image restoration process is executed. The image analysis unit 111 identifies an image having a large contrast as an image in which the aliasing due to the chromatic aberration is intensified. Further, an image having an edge portion of a large contrast is identified as an image in which the aliasing due to the chromatic aberration and demosaicing process is intensified. Here, the portion having a large contrast refers to a portion that can be represented by a contrast ratio of, and has the contrast ratio in a range of, for example, from 130:1 to 170:1 in terms of 8-bit, preferably from 140:1 to 160:1, further preferably from 145:1 to 155:1.

The image analysis unit 111 analyzes the mosaic image data or the demosaicing image data to identify a portion in which the aliasing due to the chromatic aberration and demosaicing process is intensified, and/or, whether or not the aliasing due to the chromatic aberration is generated, and sends the identified result as the analysis information to the information acquisition unit 115.

The information acquisition unit 115 generates the control information on the basis of the analysis information and the imaging information. Specifically, the unit 115 refers to the acquired imaging information and the table information concerning the aliasing to identify whether or not the aliasing due to the chromatic aberration is intensified. Then, in a case where it is determined, depending on the imaging information, that the aliasing due to the chromatic aberration is not to be intensified, the information acquisition unit 115, further with taking into account the analysis information, determines whether or not the aliasing due to the chromatic aberration is intensified if the point image restoration process is executed, and in a case where it is determined, depending on the imaging information and the analysis information, that the aliasing due to the chromatic aberration is not intensified, the unit 115 generates and sends the control information that the point image restoration process is executed (in the case of A-1 of FIG. 12).

In a case where it is determined depending on the imaging information that the aliasing due to the chromatic aberration is not intensified, but it is determined depending on the analysis information that the aliasing due to the chromatic aberration is intensified, the control information that the point image restoration process is not executed is generated and sent (in the case of B-1 of FIG. 12).

On the other hand, it is determined depending on the imaging information that the aliasing due to the chromatic aberration is intensified, the information acquisition unit 115 may generate the control information that the point image restoration process is not executed without taking into account the analysis information. Even in a case where it is determined depending on the imaging information that the aliasing due to the chromatic aberration is intensified, the control information may include information concerning a region where the aliasing due to the chromatic aberration is generated with further the analysis information being taken into account.

Further, in the second embodiment of the image processing device 28, the information acquisition unit 115 which acquires the analysis information can also more adequately distinguish the region (portion) to be subjected to the point image restoration process from the region (portion) not to be subjected to the point image restoration process. Specifically, in the case where the aliasing due to the chromatic aberration is intensified, the information acquisition unit 115 identifies at which portion the aliasing due to the chromatic aberration is intensified, depending on the analysis information, to generate control information with taking into account the identified portion. For example, the control may be performed such that the point image restoration process is not executed on the portion where the aliasing due to the chromatic aberration is intensified and the point image restoration process is executed on other portions (B-2 of FIG. 12), the control may be performed such that weaker point image restoration process is executed on the portion where the aliasing due to the chromatic aberration is intensified and the normal point image restoration process or stronger point image restoration process is executed on other portions (B-3 of FIG. 12), and the control may be performed such that the strength of the point image restoration process is varied depending on the intensified degree of the aliasing due to the chromatic aberration (B-4 of FIG. 12).

Figure 15:
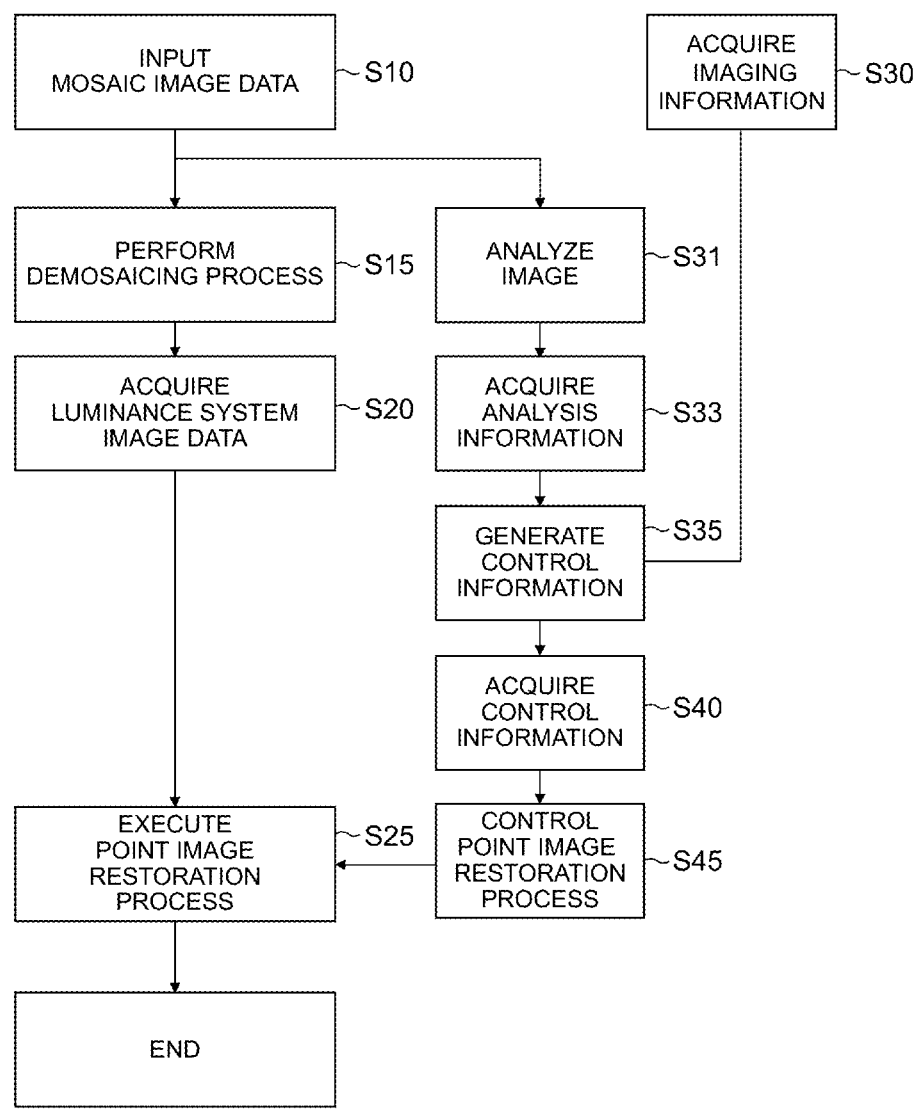
FIG. 15 is an illustration showing an operation flow in the second embodiment of the image processing device.

FIG. 15 is a flow diagram of the second embodiment of the image processing device 28. The same parts as the flow diagram of the first embodiment of the image processing device 28 shown in FIG. 11 are designated by the same reference numerals and the description thereof is omitted. In the flow diagram of the second embodiment of the image processing device 28 shown in FIG. 15, as compared with the flow diagram of the second embodiment of the image processing device 28 shown in FIG. 11, the flow diagram of the second embodiment is different from the latter in that the image analysis is performed by the image analysis unit 111 (step S31) and the information acquisition unit 115 acquires also the analysis information (step S33).

In the second embodiment of the image processing device 28 shown in FIG. 15, the image analysis unit 111 performs the image analysis on the mosaic image data (step S31). The image analysis unit 111 may perform the image analysis on the demosaicing image data and may perform the image analysis on the luminance system image data.

Then, the image analysis unit 111 performs the image analysis (step S31), generates image analysis information on the basis of a result of the image analysis, and sends the image analysis information to the information acquisition unit 115. Then, the information acquisition unit 115 acquires the image analysis information (step S33).

[Third Embodiment of Image Processing Device]

Figure 16:
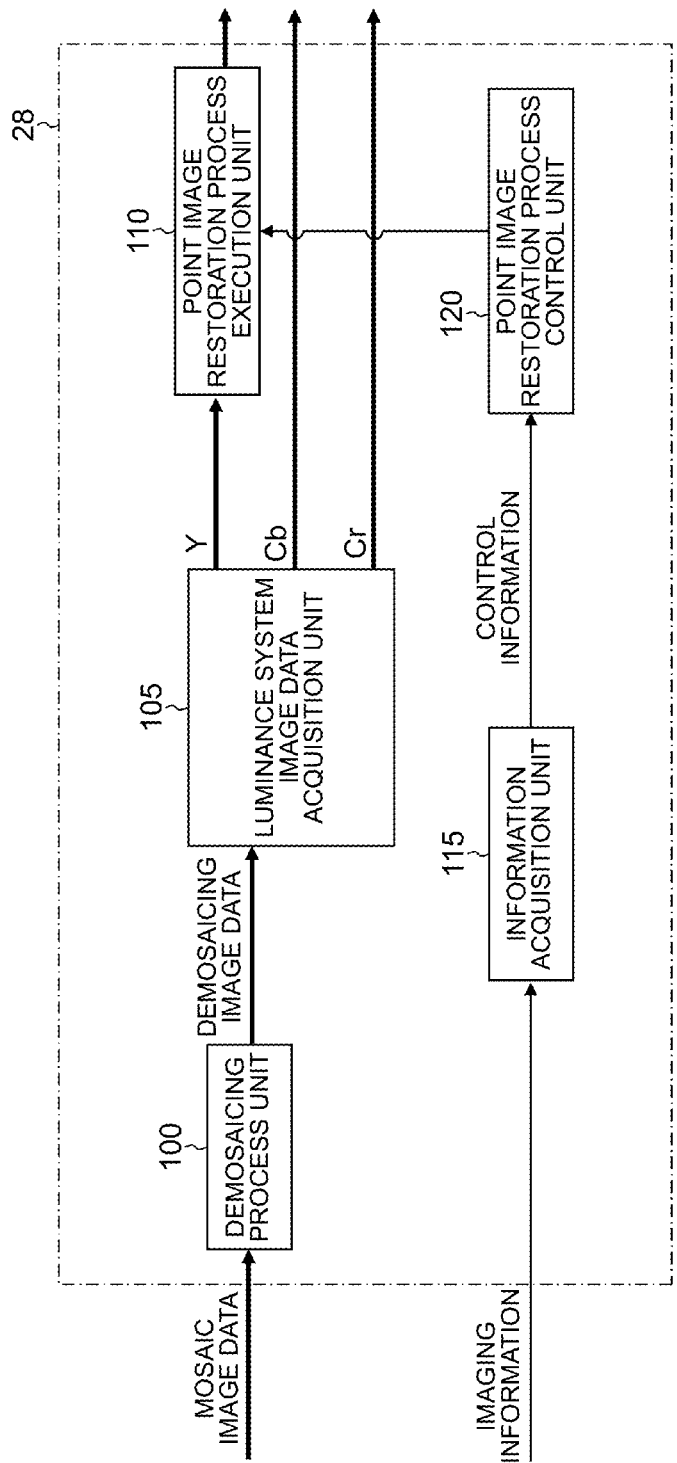
FIG. 16 is a main part block diagram showing a third embodiment of an image processing device.

FIG. 16 shows a third embodiment of the image processing device 28. The same parts as the first embodiment of the image processing device 28 in FIG. 3 are designated by the same reference numerals and the description thereof is omitted. In comparing the third embodiment of the image processing device 28 with the first embodiment of the image processing device 28, the third embodiment is different in that the point image restoration process is executed on a luminance signal Y as a specific example of the luminance system image data, from the first embodiment in which the point image restoration process is executed on the luminance system image data. The execution of the point image restoration process on the luminance signal Y allows the point image restoration process to be adequately executed. Here, the luminance signal Y refers to a luminance signal Y in the color space represented by the luminance signal Y and color-difference signals Cb and Cr.

[Fourth Embodiment of Image Processing Device]

Figure 17:
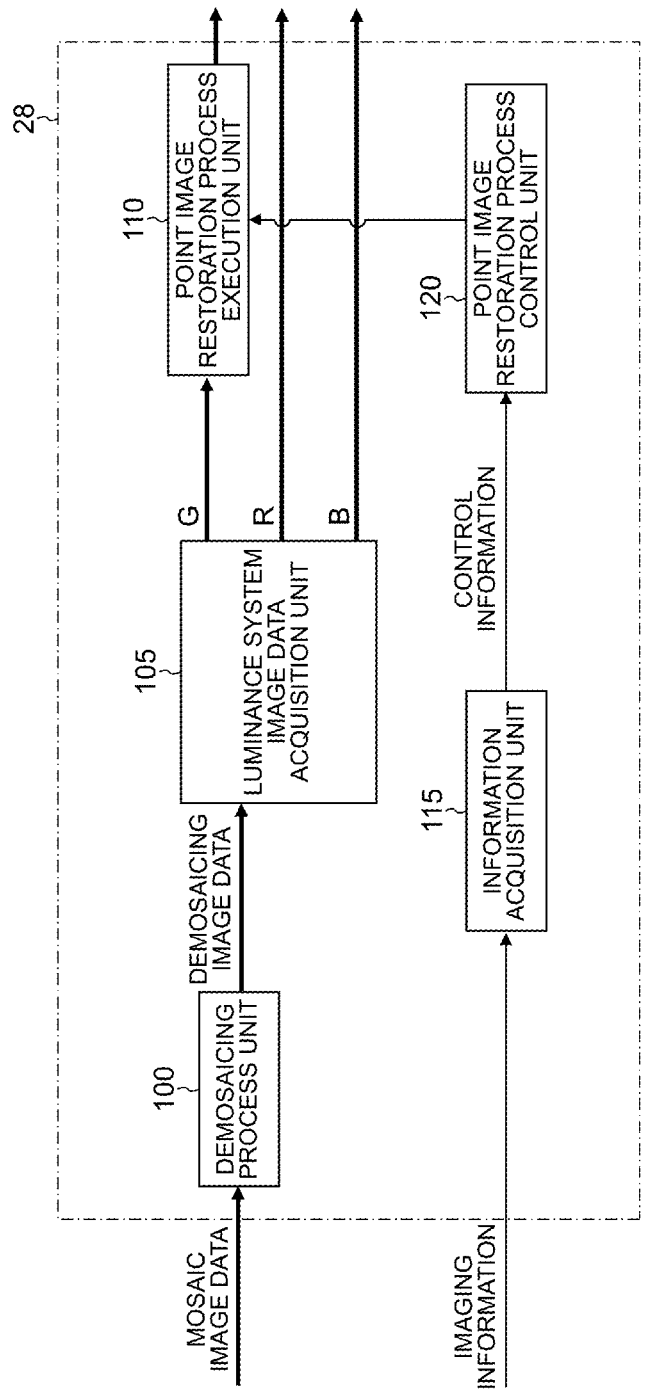
FIG. 17 is a main part block diagram showing a fourth embodiment of an image processing device.

FIG. 17 shows a fourth embodiment of the image processing device 28. The same parts as the first embodiment of the image processing device 28 in FIG. 3 are designated by the same reference numerals and the description thereof is omitted. In comparing the fourth embodiment of the image processing device 28 with the first embodiment of the image processing device 28, the fourth embodiment is different in that the point image restoration process is executed on G color data as a specific example of the luminance system image data, from the first embodiment in which the point image restoration process is executed on the luminance system image data. The G color data is a value that most contributes to generation of a value of the luminance signal Y (see Formula 1, Formula 2), and thus, the execution of the point image restoration process on the G color data allows more accurate point image restoration process to be executed.

[Modification Example of Image Pickup Device]

Figure 18:
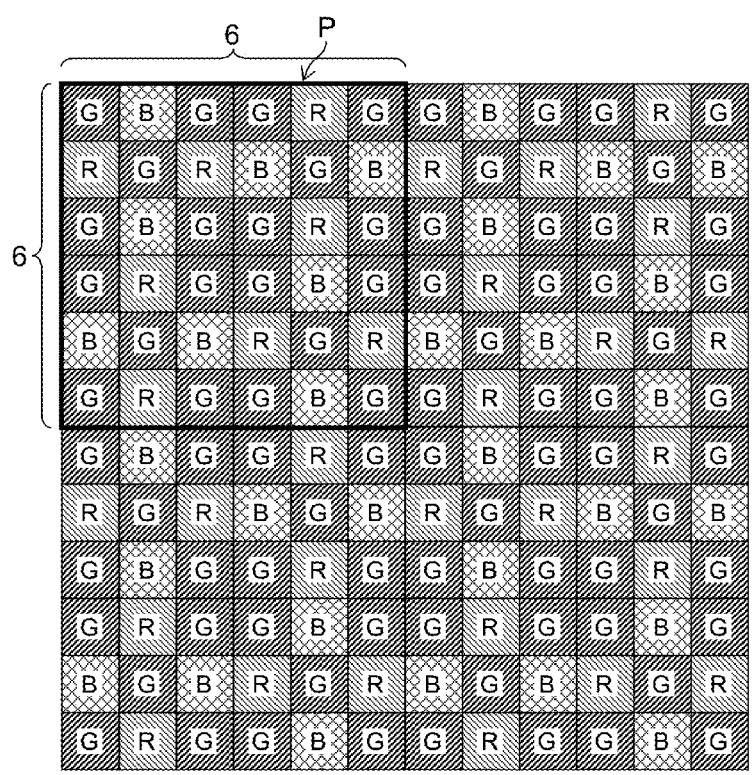
FIG. 18 is an illustration showing a modification example of a mosaic color filter array arranged on an image pickup device.

FIG. 18 is an illustration showing a modification example of the image pickup device 22. Particularly, in terms of the color filter array arranged on the light receiving surface of the image pickup device 22, a color filter array ("X-trans" (registered trademark)) is shown as a modification example of the color filter array described in FIG. 2. In the invention, various color filter arrays may be used for the image pickup device 22, and FIG. 18 shows one modification example of them.

A color filter array of this image pickup device 22 includes a basic array pattern P consisting of a square array pattern corresponding to 6×6 pixels (pattern surrounded with a thick frame), and the basic array patterns P are arranged repeatedly in a horizontal direction and a vertical direction. Specifically, this color filter array has color filters of red (R), green (G), and blue (B) (R filter, G filter, and B filter) arranged at a predetermined period. Such an arrangement of the R filter, the G filter, and the B filter at predetermined period like this makes it possible to perform, in accordance with the repeated pattern, a process such as the image processing on the RAW data of RGB (mosaic image data) read out from the image pickup device 22, as compared with a random array known in related art.

In the color filter array shown in FIG. 18, one or more G filters corresponding to a color which most contributes to acquisition of the luminance signal (G color) are arranged in the basic array pattern in lines in horizontal, vertical, diagonally right-up (NE), and diagonally left-up (NW) directions of the color filter array.

The G filters each corresponding to a luminance system pixel are arranged in the lines in the horizontal, vertical, and diagonally (NE and NW) directions of the color filter array, which can improve a reproduction accuracy of the synchronization process (demosaicing process) in a high frequency region not limited to in a direction of high frequency.

In the color filter array shown in FIG. 18, one or more R filters and B filters corresponding to two or more other colors than the above G color (R and B colors in this embodiment) are arranged in the basic array pattern in lines in the horizontal and vertical directions of the color filter array.

The R filters and the B filters are arranged in the lines in the horizontal and vertical directions of the color filter array, which can reduce generation of the false color (color moire).

This makes it possible to omit an optical low-pass filter for reducing (suppressing) the generation of the false color. Even in a case of applying the optical low-pass filter, those weak in a functionality of cutting a high frequency component for preventing the generation of the false color can be used, allowing the resolution not to be deteriorated.

Further, the basic array pattern P of the color filter array shown in FIG. 18 has the pixel numbers of R pixels, G pixels, and B pixels that are 8, 20, and 8, respectively, corresponding to the R, G, and B filters in the basic array pattern. In other words, a ratio among the pixel numbers of the RGB pixels is 2:5:2, and it is found that the ratio of the pixel number of the G pixels most contributing to acquisition of the luminance signal is larger than the ratios of the pixel numbers of the R pixels and B pixels of other colors.

As described above, the ratio of the pixel number of the G pixels is different from the ratios of the pixel numbers of the R and B pixels, and particularly, the ratio of the pixel number of the G pixel most contributing to acquisition of the luminance signal is made larger than the ratios of the pixel numbers of the R and B pixels, which can suppress the aliasing in the synchronization process and can improve high frequency reproducibility.

Figure 19:
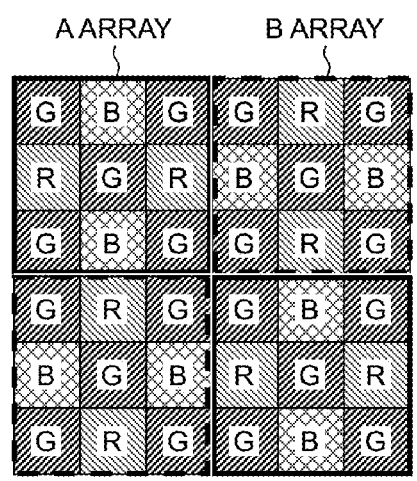
FIG. 19 is an illustration showing a basic array pattern shown in FIG. 18 in a state of being divided into four each having 3 pixels×3 pixels.

FIG. 19 shows a state obtained by dividing the basic array pattern P shown in FIG. 18 into four each having 3×3 pixels. As shown in FIG. 19, the basic array pattern P has an array in which an A array of 3×3 pixels surrounded with a solid line frame and a B array of 3×3 pixels surrounded with a broken line frame are alternately arrayed in the horizontal and vertical directions.

The A array and the B array each have the G filters on four corners and the center thereof and are arranged both diagonals. The A array has the R filters arrayed in the horizontal direction and the B filters arrayed in the vertical direction with the center G filter being interposed. On the other hand, the B array has the B filters arrayed in the horizontal direction and the R filters arrayed in the vertical direction with the center G filter being interposed. In other words, a positional relationship between the R filter and the B filter is inverted between the A array and the B array, but other arrangements are identical.

The G filters on the four corners in the A array and the B array correspond to a square array G filter of 2×2 pixels because the A array and the B array are alternately arranged in the horizontal and vertical directions.

The object of the invention may be also achieved by that a system or a computer in the device (or, CPU, MPU (Micro-Processing Unit)) reads out and executes a program code (program) from a storage medium (non-transitory recording medium) which has stored therein the program code implementing flow procedures shown in the embodiments described above. The invention may be provided as a computer program product that stores therein an executable code for using the method according to the invention.

In this case, the program code itself read out from the storage medium may achieve the functions of the embodiments described above. Therefore, the program code and a computer-readable storage medium storing/recording the program code therein may also configure one aspect of the invention.

Examples of the storage medium used for supplying the program code include, for example, a floppy (registered trademark) disk, hard disk, optical disk, magnetic optical disk, CD-ROM (Compact Disc Read Only Memory), CD-R (Compact Disc Recordable), magnetic tape, non-volatile memory card, ROM (Read Only Memory) and the like.

The functions of the embodiments described above may be achieved by that the computer executes the read out program. The execution of the program also includes a case where the OS (Operating System) or the like running on the computer executes a part or all of the actual processes on the basis of an instruction of the program.

Further, the functions of the embodiments described above may be achieved also by a function enhancement board inserted into the computer, or a function enhancement unit coupled with the computer. In this case, first, the program read out from the storage medium is written on a memory included in the function enhancement board inserted into the computer or in the function enhancement unit coupled with the computer. After that, the CPU or the like included in the function enhancement board or in the function enhancement unit executes a part or all of the actual processes on the basis of the instruction of the program. Processing performed by such a function enhancement board or function enhancement unit may also achieve the functions of the embodiments described above.

Each step in the flows of the embodiments described above may not be limited to being implemented using software (computer), but may be implemented using hardware (electronic circuit).

<Application Example to EDoF System>

The point image restoration process executed by the point image restoration process execution unit 110 in the above embodiments is an image processing in which a point spread (point image blur) is recovered and corrected depending on a certain imaging condition (e.g., aperture value, focal length, kind of lens, etc.) to restore an original subject image, but the image processing to which the invention is applicable is not limited to the point image restoration process in the embodiments described above. For example, the point image restoration process according to the invention can also be applied to the point image restoration process on the image data which is imaged and obtained by an optical system (imaging lens, etc.) having an extended depth of field (focus) (EDoF). Execution of the point image restoration process on the image data of a blurred image which is imaged and obtained by an EDoF optical system with the depth of field (depth of focus) being extended makes it possible to restore and generate high resolution image data that is in focus in a wide range. In this case, the point image restoration process is executed using the restoration filter on the basis of the point spread function of the EDoF optical system (PSF, OTF (optical transfer function), MTF (modulation transfer function, magnitude transfer function), PTF (phase transfer function), etc.), the restoration filter having a filter coefficient set so that the good image restoration can be made in a range of the extended depth of field (depth of focus).

Hereinafter, a description is given of an exemplary system (EDoF system) relating to restoration of the image data that is imaged and obtained through the EDoF optical system. In the example shown below, the point image restoration process is also executed on the luminance signal (luminance signal Y) acquired from the image data (RGB data) after the demosaicing process.

Figure 20:
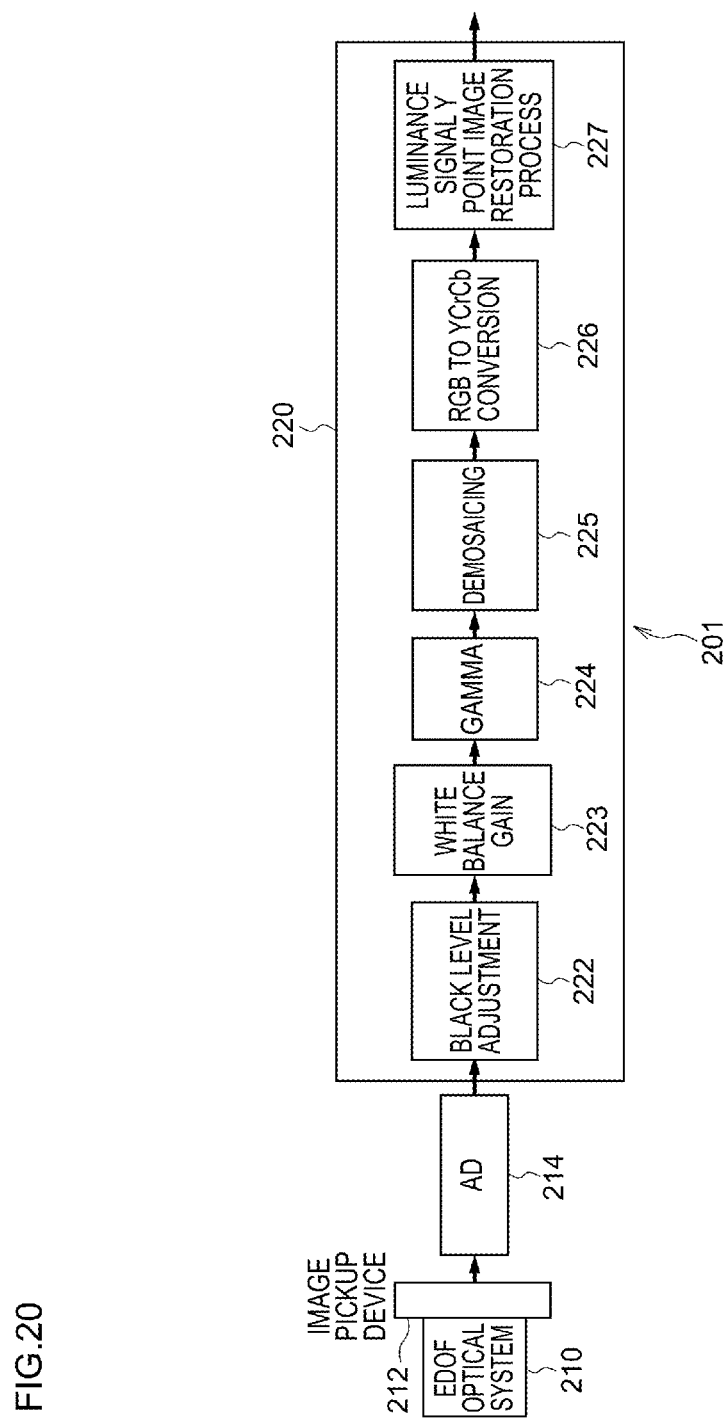
FIG. 20 is a block diagram showing a form of an image capturing module including an EDoF optical system.

FIG. 20 is a block diagram showing a form of an image capturing module 201 having the EDoF optical system. The image capturing module (digital camera, etc.) 201 in this example includes an EDoF optical system (lens unit) 210, image pickup device 212, AD converter 214, and point image restoration process block (image processor) 220.

Figure 21:
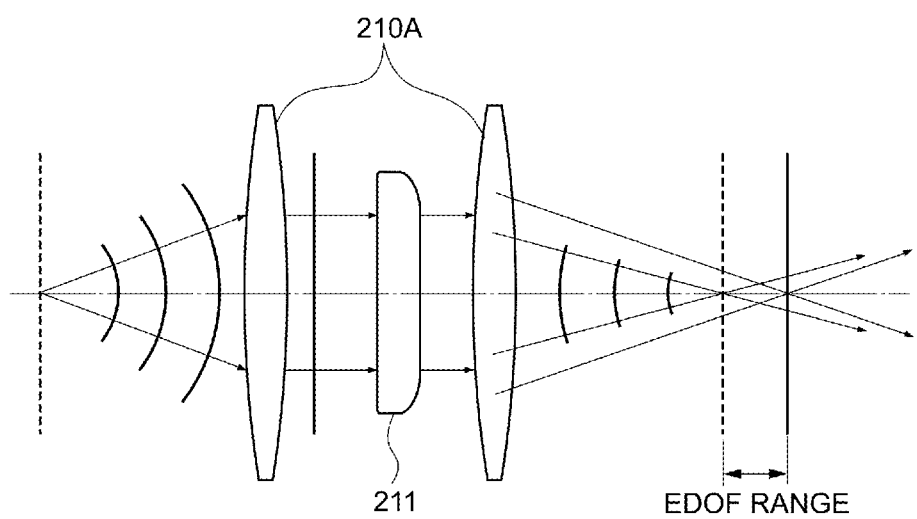
FIG. 21 is an illustration showing an exemplary EDoF optical system.

FIG. 21 is an illustration showing an example of the EDoF optical system 210. The EDoF optical system 210 in this example has a single focus fixed imaging lens 210A and an optical filter 211 located at a pupil position. The optical filter 211 which modulates a phase makes the EDoF optical system 210 (imaging lens 210A) have the EDoF such that the extended depth of field (depth of focus) (EDoF) is obtained. In this way, the imaging lens 210A and the optical filter 211 constitute a lens section which modulates the phase to extend the depth of field.

The EDoF optical system 210 includes other components as needed, and for example, a diaphragm (omitted in the figure) is disposed near the optical filter 211. The number of the optical filter 211 may be one, or a combination of plural optical filters may be used. The optical filter 211 is only an example of an optical phase modulation device, and the EDoF optical system 210 (imaging lens 210A) may be made to have the EDoF by another device. For example, instead of disposing the optical filter 211, the imaging lens 210A whose lens is designed to have a function equivalent to that of the optical filter 211 of the example may achieve making the EDoF optical system 210 have the EDoF.

Specifically, the EDoF optical system 210 can be made to have the EDoF by use of various devices for changing a wavefront of an image formed on the light receiving surface of the image pickup device 212. For example, as the device for making EDoF optical system 210 have the EDoF, there may be used an "optical element whose thickness is variable", "optical element whose refractive index is variable (gradient index wavefront modulation lens, etc.)", "optical element whose thickness or refractive index is variable due to coding to the lens surface (wavefront modulation hybrid lens, optical element formed as a phase front on the lens surface, etc.)", and "liquid crystal element whose light phase distribution is modulatory (liquid crystal spatial phase modulation element, etc.)". In this way, the invention is applicable not only to a case where an image can be formed to be regularly distributed by use of the optical wavefront modulation element (optical filter 211 (phase plate)) but also to a case where an image with distribution similar to that obtained using the optical wavefront modulation element can be formed using the imaging lens 210A itself without using the optical wavefront modulation element.

The EDoF optical system 210 shown in FIG. 21 in which a focusing mechanism for mechanical focusing can be omitted may be reduced in size, and therefore, can be preferably mounted on a camera phone or a personal digital assistance.

The optical image after passing through the EDoF optical system 210 having been made to have the EDoF is formed into an image on the image pickup device 212 shown in FIG. 20 and converted into an electric signal in the device 212.

The image pickup device 212 is constituted by plural pixels arranged in a matrix in a predetermined pattern array (Bayer array, G-striped R/G-fully-checkered array, X-Trans array, honeycomb array, etc.) and each pixel is configured to include a microlens, color filter (RGB color filter in the example) and photodiode. The optical image through the EDoF optical system 210 incident on the light receiving surface of the image pickup device 212 is converted into the signal electrical charge of an amount corresponding to an amount of its incident light by the photodiodes arranged on the light receiving surface. Then, the signal electrical charge of R, G, and B accumulated in the photodiodes is serially output as the voltage signal (image signal) for each pixel.

The AD converter 214 converts analog R, G, and B image signals output for each pixel from the image pickup device 212 into digital RGB image signals. The digital image signal obtained through the digital image signal conversion by the AD converter 214 is added to the point image restoration process block 220.

The point image restoration process block 220 includes, for example, a black level adjuster 222, white balance gain unit 223, gamma processor 224, demosaicing process unit 225, RGB/YCrCb converter 226, and luminance signal Y point image restoration process unit 227.

The black level adjuster 222 subjects the digital image signal output from the AD converter 214 to black level adjustment. The black level adjustment may be made by using a well-known method. For example, the black level adjustment is performed, with attention being put on a certain efficient photoelectric conversion element, by finding an average of signals for acquiring dark current amount respectively corresponding to plural OB photoelectric conversion elements included in a row of photoelectric conversion element containing the relevant efficient photoelectric conversion element, and subtracting the average from the signal for acquiring dark current amount corresponding to the relevant efficient photoelectric conversion element.

The white balance gain unit 223 performs gain adjustment depending on a white balance gain of each color signal of RGB included in the digital image signal having black level data adjusted.

The gamma processor 224 performs gamma correction for tone correction of halftone or the like so that the R, G, and B image signals having the white balance adjusted have desired gamma characteristics.

The demosaicing process unit 225 performs the demosaicing process on the R, G, and B image signals after subjected to the gamma correction. Specifically, the demosaicing process unit 225 subjects the R, G, and B image signals to a color interpolation process to generate a set of image signals (R signal, G signal, B signal) output from the light received pixels in the image pickup device 212. That is to say, the pixel signal from each of light received pixels before a color demosaicing process is any of the R, G, and B image signals, but a set of three pixel signals of R, G, and B signals respectively corresponding to the light received pixels is output after the color demosaicing process.

The RGB/YCrCb converter 226 converts the R, G, and B signals for each pixel after subjected to the demosaicing process into the luminance signal Y and the color-difference signals Cr and Cb to output the luminance signal Y and the color-difference signals Cr and Cb for each pixel.

The luminance signal Y point image restoration process unit 227 executes the point image restoration process on the luminance signal Y from the RGB/YCrCb converter 226 on the basis of the restoration filter stored in advance. The restoration filter includes a deconvolution kernel having a kernel size of 7×7 (corresponding to the number of taps, M=7, N=7), for example, and an operation coefficient corresponding to the deconvolution kernel (corresponding to restoration gain data, filter coefficient) and is used for the deconvolution process (deconvolution operation process) by an amount of phase modulation by the optical filter 211. The restoration filter corresponding to the optical filter 211 is stored in a memory which is not shown in the figure (e.g., memory incidentally provided in the luminance signal Y point image restoration process unit 227). The kernel size of the deconvolution kernel is not limited to 7×7.

Figure 22:
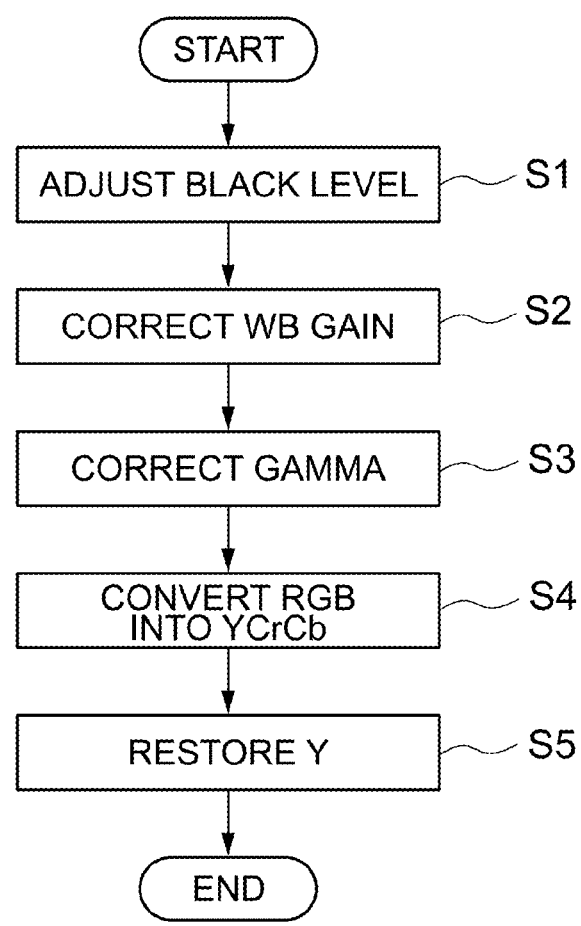
FIG. 22 is a flowchart showing an exemplary restoration process in a restoration process block shown in FIG. 20.

Next, a description is given of the point image restoration process by the point image restoration process block 220. FIG. 22 is a flowchart showing an exemplary point image restoration process in the point image restoration process block 220 shown in FIG. 20.

The digital image signal is input from the AD converter 214 to one of inputs of the black level adjuster 222 and the black level data is input to the other of the inputs. The black level adjuster 222 subtracts the black level data from the digital image signal and outputs the digital image signal from which the black level data has been subtracted to the white balance gain unit 223 (step S1). By doing so, the digital image signal does not include the black level component, and thus, the digital image signal indicating the black level is "0".

The image data after the black level adjustment is processed by the white balance gain unit 223 and the gamma processor 224 in this order (step S2 and S3).

The R, G, and B signals having been subjected to the gamma correction are subjected to the demosaicing process by the demosaicing process unit 225, and thereafter, converted into the luminance signal Y and the chrominance signals Cr and Cb in the RGB/YCrCb converter 226 (step S4).

The luminance signal Y point image restoration process unit 227 executes on the luminance signal Y the point image restoration process performing the deconvolution process by an amount of phase modulation by the optical filter 211 in the EDoF optical system 210 (step S5). Specifically, the luminance signal Y point image restoration process unit 227 performs the deconvolution process (deconvolution operation process) of the luminance signal (here, luminance signal of 7×7 pixels) corresponding to a pixel group in units of predetermined pixels the center of which group is any pixel as a target to be processed, and the restoration filter stored in the memory or the like in advance (deconvolution kernel of 7×7 and its operation coefficient). The luminance signal Y point image restoration process unit 227 executes the point image restoration process by repeating the deconvolution process for each pixel group in units of predetermined pixels so as to cover all over the area of an image pickup surface to eliminate an image blur across the image. The restoration filter is set depending on the position of the center of the pixel group subjected to the deconvolution process. In other words, a common restoration filter is applied to the pixel groups adjacent to each other. In order to simplify the point image restoration process, it is preferable to apply the common restoration filter to the all pixel groups.

As described above, the point image (optical image) of the luminance signal after passing through the EDoF optical system 210 is formed into an image as a large point image (blurred image) on the image pickup device 212 as shown in (a) portion of FIG. 4 also in the application example of the Edof system, but is restored into a small point image (high resolution image) through the deconvolution process by the luminance signal Y point image restoration process unit 227 as shown in (b) portion of FIG. 4.

As described above, the execution of the point image restoration process on the luminance signal after the demosaicing process can eliminate necessity of holding the parameters of the point image restoration process separately for RGB, and speed up the point image restoration process. Moreover, the deconvolution process in which the R, G, and B image signals corresponding to the R, G, and B pixels positioned apart at a distance are respectively collected in one unit is not performed, but the deconvolution process in which the luminance signals of adjacent pixels are collected in a predetermined unit, to which unit the common restoration filter is applied, is performed, improving the accuracy of the point image restoration process. As for the color-difference signals Cr and Cb, in terms of human eyes characteristics, even if the resolution is not improved by the point image restoration process, the quality of image is allowable. In a case where the image is recorded in a compression format such as JPEG, since the color-difference signal is compressed at a compression ratio higher than the luminance signal, there is little necessity to improve the resolution by the point image restoration process. In this way, both restoration accuracy improvement and simplification and speed-up of the process can be attained.

The point image restoration process according to the embodiments of the invention can be applied also to the point image restoration process in the EDoF system as described above.

The digital camera is described in FIG. 1 as an embodiment of the image capture device according to the invention (the image capture device including the image processing device 28 according to the invention), but a configuration of an imaging device is not limited thereto. Examples of another imaging device according to the invention may include, for example, a built-in or external camera for PC, or a portable terminal device having the imaging function as described below.

Examples of the portable terminal device as an embodiment of the imaging device according to the invention include, for example, mobile phones, smartphones, PDAs (Personal Digital Assistants), and portable game consoles. Hereinafter, a description is given in detail using the smartphone (multifunctional mobile phone) as an example with reference to the drawings.

Figure 23:
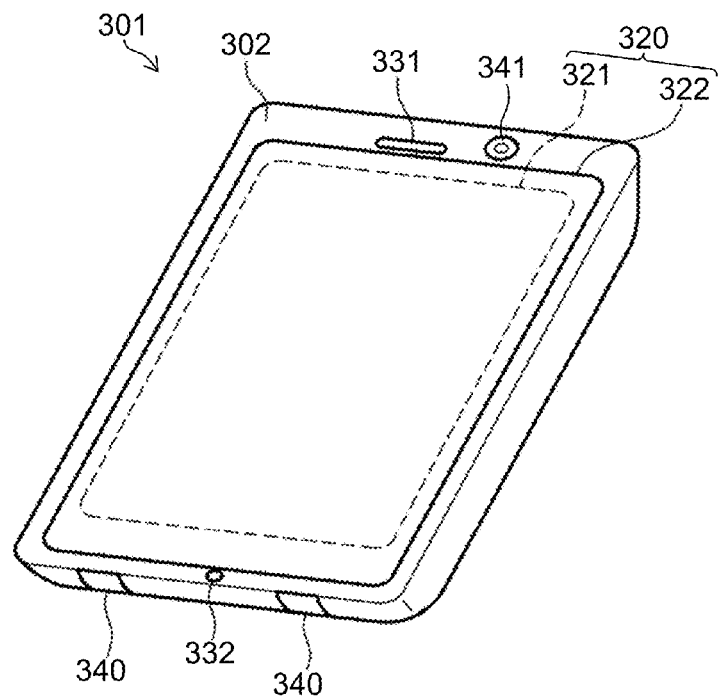
FIG. 23 is an illustration showing another embodiment of an image capture device as an aspect of the present invention.

FIG. 23 shows an outer appearance of a smartphone 301 which is an embodiment of the imaging device of the invention. The smartphone 301 shown in FIG. 23 having a housing 302 shaped in a flat plate includes on one face of the housing 302 a display and input unit 320 in which a display panel 321 as a display unit and an operation panel 322 as an input unit are integrated. Such a housing 302 includes a speaker 331, microphone 332, operation unit 340, and camera unit 341. A configuration of the housing 302 is not limited thereto, and a configuration in which the display unit and the input unit are independent of each other, and a configuration having a clamshell structure or a slide mechanism may be used, for example.

Figure 24:
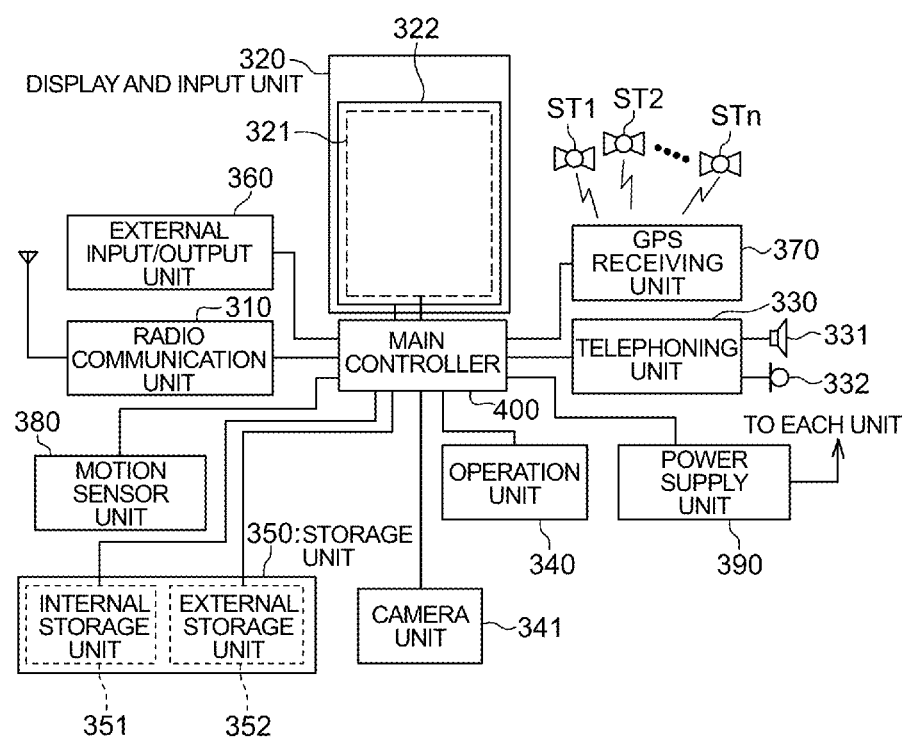
FIG. 24 is a block diagram showing a configuration of the image capture device shown in FIG. 23.

FIG. 24 is a block diagram showing the configuration of the smartphone 301 shown in FIG. 23. As shown in FIG. 24, included are as main components of the smartphone a radio communication unit 310, display and input unit 320, telephoning unit 330, operation unit 340, camera unit 341, storage unit 350, external input/output unit 360, GPS (Global Positioning System) receiving unit 370, motion sensor unit 380, power supply unit 390, and main controller 400. The smartphone 301 has, as a main function, a radio communication function for carrying out mobile radio communication with a base station device BS via a mobile communication network NW. A form may be considered in which the image processor 28 described above mainly belongs to the main controller 400, but not limited thereto.

The radio communication unit 310 carries out radio communication with the base station device BS included in the mobile communication network NW according to an instruction from the main controller 400. Such radio communication is used to transmit and receive various pieces of file data such as audio data, image data and the like, and e-mail data and the like and receive Web data, streaming data and the like.

The display and input unit 320 is a so-called touch panel which, by way of control by the main controller 400, displays and visually delivers to a user an image (still image and moving image) and text information, as well as detects a user's operation on the displayed information, and includes the display panel 321 and the operation panel 322.

The display panel 321 uses a LCD (Liquid Crystal Display), an OELD (Organic Electro-Luminescence Display) and the like as a display device. The operation panel 322, which is placed such that an image displayed on a display surface of the display panel 321 can be visually recognized, is a device for detecting one or more coordinates operated by a user's finger or a stylus. If the device like this is operated by a user's finger or a stylus, a detection signal generated due to the operation is output to the main controller 400. Subsequently, the main controller 400 detects an operated position (coordinates) on the display panel 321 on the basis of the received detection signal.

As shown in FIG. 23, the display panel 321 and operation panel 322 in the smartphone 301 which is illustrated as an embodiment of the imaging device according to the invention are integrated to constitute the display and input unit 320, and the operation panel 322 is arranged in a manner to fully cover the display panel 321. In a case of using such an arrangement, the operation panel 322 may have a function to detect the user's operation on also an area outside the display panel 321. In other words, the operation panel 322 may have a detection area for an overlapping portion overlapped with the display panel 321 (hereinafter, referred to as a displayed area) and a detection area for a peripheral portion not overlapped with the display panel 321 other than the overlapping portion (hereinafter, referred to as a non-displayed area).

Note that a size of the displayed area and a size of the display panel 321 may completely match each other, but both sizes may not necessarily match. The operation panel 322 may have two sensitive areas of the peripheral portion and an inside portion other than that. Further, a width of the peripheral portion is appropriately designed depending on a size of the housing 302 and the like. A position detection method used for the operation panel 322 includes a matrix switch method, resistance film method, surface acoustic wave method, infrared ray method, electromagnetic induction method, electrostatic capacitance method and the like, any method of which may be used.

The telephoning unit 330 having the speaker 331 and the microphone 332 converts user voice input through the microphone 332 into the audio data processable by the main controller 400 to output to the main controller 400, and decodes the audio data received by the radio communication unit 310 or the external input/output unit 360 to output from the speaker 331. As shown in FIG. 23, for example, the speaker 331 may be mounted on the same face as the display and input unit 320 is provided, and the microphone 332 may be mounted on a lateral face of the housing 302.

The operation unit 340 which is a hardware key using a key switch and the like accepts an instruction from the user. For example, as shown in FIG. 23, the operation unit 340 is mounted on a lateral face of the housing 302 of the smartphone 301, and is a press-button type switch which is turned on when pressed down by a finger or the like and is brought into a turned-off state by a restoring force of a spring or the like when the finger is released.

The storage unit 350 stores a control program and control data for the main controller 400, application software, address data having a name, telephone number and the like of the communication other end associated with each other, data of transmitted and received e-mail, Web data downloaded by way of Web browsing, and downloaded content data, and transiently stores streaming data or the like. The storage unit 350 includes an internal storage unit 351 built in the smartphone and an external storage unit 352 having a detachable external memory slot. Each of the internal storage unit 351 and the external storage unit 352 included in the storage unit 350 is attained by use of a storage medium such as a flash memory type, hard disk type, multimedia card micro type, card type memory (e.g., Micro SD ((registered trademark) memory, etc.), RAM (Random Access Memory), and ROM (Read Only Memory).

The external input/output unit 360 serves as an interface with all external devices coupled to the smartphone 301 to allow other external devices to be directly or indirectly connected via a communication or the like (e.g., USB (Universal Serial Bus), IEEE1394, etc.) or network (e.g., Internet, wireless LAN, Bluetooth (registered trademark), RFID (Radio Frequency Identification), IrDA (Infrared Data Association) (registered trademark), UWB (Ultra Wideband) (registered trademark), ZigBee (registered trademark), etc.).

Examples of the external device coupled to the smartphone 301 include, for example, a wired/wireless head set, wired/wireless external charger, wired/wireless data port, memory card or SIM (Subscriber Identity Module Card)/UIM (User Identity Module Card) card connected via a card socket, external audio and video device connected via an audio and video I/O (Input/Output) terminal, external audio and video device wirelessly connected, smartphone via a wired/wireless connection, personal computer via a wired/wireless connection, PDA via a wired/wireless connection, personal computer via a wired/wireless connection, earphone, and the like. The external input/output unit can deliver data received by way of transmission from such an external device above to the respective components in the smartphone 301 and transmit the data in the smartphone 301 to the external devices.

The GPS receiving unit 370 receives GPS signals transmitted from GPS satellites ST1 to STn to perform positioning arithmetic processing on the basis of the received plural GPS signals according to an instruction from the main controller 400, and detects a position including latitude, longitude, and altitude of the smartphone 301. When positional information can be acquired from the radio communication unit 310 or the external input/output unit 360 (e.g., wireless LAN), the GPS receiving unit 370 may use the positional information to detect the position.

The motion sensor unit 380 which includes, for example, a triaxial acceleration sensor or the like detects physical motion of the smartphone 301 according to an instruction from the main controller 400. Detection of the physical motion of the smartphone 301 allows a direction or acceleration of motion of the smartphone 301 to be detected. Such a detection result is to be output to the main controller 400.

The power supply unit 390 supplies electrical power stored in a battery (not shown) to each unit of the smartphone 301 according to an instruction from the main controller 400.

The main controller 400 which includes a microprocessor operates according to the control program or control data stored in the storage unit 350 and collectively controls the respective parts of the smartphone 301. The main controller 400 has a mobile communication controlling function to control each unit in a communication system and an application processing function in order to perform audio communication or data communication via the radio communication unit 310.

The application processing function is attained by the main controller 400 operating according to the application software stored in the storage unit 350. Examples of the application processing function include, for example, an infrared communication function to control the external input/output unit 360 to perform the data communication with a counterpart device, e-mail function to transmit and receive an e-mail, Web browsing function to view a Web page, and the like.

The main controller 400 has an image processing function to display a video on the display and input unit 320 and so forth on the basis of the image data such as the received data or the downloaded streaming data (data of still image and moving image). The image processing function refers to a function that the main controller 400 decodes the above image data and subjects such a decoding result to the image processing to display the image on the display and input unit 320.

Further, the main controller 400 performs display control of the display panel 321 and operation detecting control to detect the user's operation via the operation unit 340 and the operation panel 322.

The main controller 400 performs the display control to display an icon for starting the application software or a software key such as a scroll bar, or display a window for creating an e-mail. Note that the scroll bar refers to a software key for accepting an instruction to move a displayed portion of an image such as a large image not entirely accommodated within a displayed area of the display panel 321.

The main controller 400 performs the operation detecting control to detect the user's operation input via the operation unit 340, accept via the operation panel 322 an operation on the above icon or input of a character string to an input field in the above window, or accept a request input via the scroll bar for scrolling of the displayed image.

Further, the main controller 400 has a touch panel controlling function to perform the operation detecting control to determine whether an operated position on the operation panel 322 is the overlapping portion (displayed area) overlapped with the display panel 321 or the peripheral portion (non-displayed area) not overlapped with the display panel 321 other than the overlapping portion, and control the sensitive area of the operation panel 322 or a displayed position of the software key.

The main controller 400 can also detect a gesture operation on the operation panel 322 and perform a predetermined function depending on the detected gesture operation. The gesture operation means not a simple touch operation of related art, but an operation including tracking by a finger or the like, simultaneously specifying a plurality of positions, or combining these operations to track at least one of a plurality of positions.

The camera unit 341 is a digital camera electronically imaging by use of the image pickup device such as a CMOS (Complementary Metal Oxide Semiconductor) or a CCD (Charge-Coupled Device). The camera unit 341 can under the control of the main controller 400 convert the image data obtained by capturing an image into a compressed image data such as JPEG (Joint Photographic coding Experts Group), for example, to store in the storage unit 350 and output via the external input/output unit 360 or the radio communication unit 310. In the smartphone 301 shown in FIG. 23, the camera unit 341 is mounted on the same face as the display and input unit 320, but, a mounted position of the camera unit 341 being not limited thereto, may be mounted on a rear face of the display and input unit 320, or a plurality of camera units 341 may be mounted. In the case where a plurality of camera units 341 are mounted, the camera unit 341 for imaging may be changed over for singularly imaging, or a plurality of camera units 341 may be simultaneously used for imaging.

The camera unit 341 can be used for the various functions of the smartphone 301. For example, an image obtained by the camera unit 341 may be displayed on the display panel 321, or an image of the camera unit 341 may be used as one of operation input on the operation panel 322. When the GPS receiving unit 370 detects a position, the position can be detected by referring an image from the camera unit 341. Further, by referring an image from the camera unit 341, without using the triaxial acceleration sensor or in combination with the triaxial acceleration sensor, an optical axis direction of the camera unit 341 of the smartphone 301 can be determined, and also a current usage environment can be determined. Of course, an image from the camera unit 341 may be used in the application software.

Besides, the image data of a still image or moving image may be added with the positional information obtained by the GPS receiving unit 370, voice information obtained by the microphone 332 (which may be voice-text converted by the main controller or the like into text information), attitude information obtained by the motion sensor unit 380 and the like to be stored in the storage unit 350 and be output via the external input/output unit 360 or the radio communication unit 310.

It goes without saying that the present invention is not limited to the embodiments described above and may be modified variously in the scope without departing from the spirit of the invention.

What is claimed is:

1. An image processing device, comprising:
   a demosaicing process device configured to perform a demosaicing process on mosaic image data output from an image pickup device to generate demosaicing image data;
   a luminance system image data acquisition device configured to acquire luminance system image data as image data regarding luminance on the basis of the demosaicing image data obtained by the demosaicing process device;
   a point image restoration process execution device configured to execute a point image restoration process on the luminance system image data acquired by the luminance system image data acquisition device;
   an information acquisition device configured to acquire control information concerning execution of the point image restoration process on the basis of imaging information concerning an imaging condition of a subject; and
   a point image restoration process control device configured to determine whether or not aliasing due to chromatic aberration and the demosaicing process is intensified due to the execution of the point image restoration process on the basis of the control information acquired by the information acquisition device, and control a processing operation of the point image restoration process execution device on the basis of the result of the determination.

2. The image processing device according to claim 1, wherein the imaging information includes at least one of information concerning a lens used for imaging, an aperture value in imaging, a focal length in imaging, and a subject distance in imaging.

3. The image processing device according to claim 1, wherein
   the point image restoration process control device determines whether or not aliasing is intensified due to the execution of the point image restoration process, depending on the control information,
   the point image restoration process control device, when determining that the aliasing is not intensified, controls the point image restoration process execution device to execute the point image restoration process on the luminance system image data, and
   the point image restoration process control device, when determining that the aliasing is intensified, inhibits the point image restoration process execution device from executing the point image restoration process on the luminance system image data.

4. The image processing device according to claim 1, wherein
   the point image restoration process control device determines whether or not aliasing is intensified due to execution of the point image restoration process, depending on the control information,
   the point image restoration process control device, when determining that the aliasing is not intensified, controls the point image restoration process execution device to execute the point image restoration process on the luminance system image data, and
   the point image restoration process control device, when determining that the aliasing is intensified, identifies an aliasing intensified region that is a region where the aliasing is intensified, and controls the point image restoration process execution device to be inhibited from executing the point image restoration process on the aliasing intensified region and to execute the point image restoration process on a region other than the aliasing intensified region.

5. The image processing device according to claim 1, wherein
   the point image restoration process control device determines whether or not aliasing is intensified due to the execution of the point image restoration process, depending on the control information,
   the point image restoration process control device, when determining that the aliasing is not intensified, controls the point image restoration process execution device to execute the point image restoration process on the luminance system image data, and
   the point image restoration process control device, when determining that the aliasing is intensified, identifies an aliasing intensified region that is a region where the aliasing is intensified, controls the point image restoration process execution device to execute the point image restoration process on a region other than the aliasing intensified region, and controls the point image restoration process execution device on the aliasing intensified region to execute a point image restoration process weaker in an effect than and in place of the point image restoration process executed on the region other than the aliasing intensified region.

6. The image processing device according to claim 1, wherein
   the point image restoration process control device determines whether or not aliasing is intensified due to execution of the point image restoration process, depending on the control information,
   the point image restoration process control device, when determining that the aliasing is not intensified, controls the point image restoration process execution device to execute the point image restoration process on the luminance system image data, and
   the point image restoration process control device, when determining that the aliasing is intensified, identifies an aliasing intensified degree that is a degree to which the aliasing is intensified, and controls the point image restoration process execution device to execute the point image restoration process with strength of the point image restoration process being varied depending on the aliasing intensified degree.

7. The image processing device according to claim 4, wherein the aliasing intensified region identified by the point image restoration process control device is a region having a high image height.

8. The image processing device according to claim 6, wherein the aliasing intensified degree identified by the point image restoration process control device becomes larger relative to the image height.

9. The image processing device according to claim 1, wherein the luminance system image data is a luminance signal obtained on the basis of color data in the demosaicing image data having the highest contribution ratio for acquiring a luminance signal, or the demosaicing image data.

10. The image processing device according to claim 1, wherein the luminance system image data is a value of a luminance signal Y in a color space represented by a luminance signal Y and color-difference signals Cb and Cr.

11. The image processing device according to claim 1, wherein the demosaicing process device includes a process of determining a correlated direction in plural pixel signals constituting the mosaic image data on the basis of the color data in the mosaic image data having the highest contribution ratio for acquiring a luminance signal.

12. The image processing device according to claim 1, wherein the demosaicing process device includes a process of detecting an edge in the mosaic image data on the basis of the color data in the mosaic image data having the highest contribution ratio for acquiring a luminance signal.

13. An image capture device comprising the image processing device according to claim 1.

14. An image processing method comprising:

a demosaicing process step of performing a demosaicing process on mosaic image data output from an image pickup device to generate demosaicing image data;

a luminance system image data acquisition step of acquiring luminance system image data regarding luminance on the basis of the demosaicing image data generated in the demosaicing process step;

a point image restoration process execution step of executing a point image restoration process on the luminance system image data acquired in the luminance system image data acquisition step;

an information acquisition step of acquiring control information concerning execution of the point image restoration process on the basis of imaging information concerning an imaging condition of a subject; and a point image restoration process control step of determining whether or not aliasing due to chromatic aberration and the demosaicing process is intensified due to the execution of the point image restoration process on the basis of the control information acquired by the information acquisition step, and controlling a processing operation of the point image restoration process execution step on the basis of the result of the determination.

15. A non-transitory computer-readable medium recording a program causing a computer to execute the image processing method according to claim 14.

* * * * *